United States Patent
Imai et al.

(10) Patent No.: US 10,308,775 B2
(45) Date of Patent: *Jun. 4, 2019

(54) FIBER-REINFORCED RESIN COMPOSITION, AND FIBER-REINFORCED COMPOSITE MATERIAL

(71) Applicant: Toray Industries, Inc., Tokyo (JP)

(72) Inventors: Naokichi Imai, Masaki (JP); Keisuke Inose, Masaki (JP); Kentaro Sano, Masaki (JP); Atsuki Tsuchiya, Nagoya (JP)

(73) Assignee: Toray Industries Inc. (JP)

( * ) Notice: Subject to any disclaimer, the term of this patent is extended or adjusted under 35 U.S.C. 154(b) by 258 days.

This patent is subject to a terminal disclaimer.

(21) Appl. No.: 15/032,713

(22) PCT Filed: Oct. 24, 2014

(86) PCT No.: PCT/JP2014/078289
§ 371 (c)(1),
(2) Date: Apr. 28, 2016

(87) PCT Pub. No.: WO2015/064483
PCT Pub. Date: May 7, 2015

(65) Prior Publication Data
US 2016/0264740 A1    Sep. 15, 2016

(30) Foreign Application Priority Data

Oct. 29, 2013  (JP) ................................. 2013-224166
Oct. 29, 2013  (JP) ................................. 2013-224167

(51) Int. Cl.
  *C08K 9/04*   (2006.01)
  *C08K 5/29*   (2006.01)
  *C08J 5/06*   (2006.01)
  *C08K 7/06*   (2006.01)

(52) U.S. Cl.
  CPC ...................................... *C08J 5/06* (2013.01); *C08K 5/29* (2013.01); *C08K 9/04* (2013.01); *C08J 2381/02* (2013.01); *C08J 2381/04* (2013.01); *C08K 7/06* (2013.01)

(58) Field of Classification Search
  CPC .................................. C08K 5/29; C08K 9/04
  See application file for complete search history.

(56) References Cited

U.S. PATENT DOCUMENTS

| 5,231,163 A * | 7/1993 | Kosaka ............. C08G 75/0222 528/210 |
| 5,462,799 A * | 10/1995 | Kobayashi ............. D01F 11/14 423/447.1 |
| 6,042,910 A | 3/2000 | Kinouchi et al. |
| 10,017,613 B2 * | 7/2018 | Imai ......................... C08J 5/042 |
| 2007/0155877 A1 * | 7/2007 | Shinohara ................ C08K 5/29 524/195 |
| 2009/0030132 A1 * | 1/2009 | Kumazawa ........... C08F 285/00 524/493 |
| 2010/0069539 A1 * | 3/2010 | Morimoto ............... C07F 9/067 524/100 |
| 2014/0130867 A1 * | 5/2014 | Hashimoto ................ C08J 5/18 136/259 |
| 2016/0257793 A1 * | 9/2016 | Imai ........................ C08J 5/042 |

FOREIGN PATENT DOCUMENTS

| JP | 5-106163 A | 4/1993 |
| JP | 5-311069 A | 11/1993 |
| JP | 10-168290 A | 6/1998 |
| JP | 10-273593 A | 10/1998 |
| JP | 2004-91504 A | 3/2004 |
| JP | 2005-239917 A | 9/2005 |
| JP | 2008-231291 A | 10/2008 |
| JP | 2009-173804 A | 8/2009 |
| JP | 2010-284900 A | 12/2010 |
| JP | 2013-166921 A | 8/2013 |

* cited by examiner

*Primary Examiner* — Vickey Nerangis
(74) *Attorney, Agent, or Firm* — DLA Piper LLP (US)

(57) ABSTRACT

A fiber-reinforced resin composition includes a polyarylene sulfide (A), a carbodiimide compound (B) and carbon fibers (C) in specific blending amounts and in which the carbon fibers (C) are surface-treated with a sizing agent (D), the carbodiimide compound (B) is an aliphatic carbodiimide compound, and the sizing agent (D) is a compound having three or more specific functional groups in one molecule; and a fiber-reinforced composite material includes a thermoplastic resin (A'), an adhesive compound (B') and reinforcing fibers (C') and in which the adhesive compound (B') is a compound having two or more specific structures in one molecule, the thermoplastic resin (A') is a thermoplastic resin containing an element other than carbon in a repeating unit structure of a main chain, and an abundance ratio Rb of the adhesive compound (B') is 1.2 or more.

10 Claims, 2 Drawing Sheets

FIBER-REINFORCED RESIN COMPOSITION, AND FIBER-REINFORCED COMPOSITE MATERIAL

TECHNICAL FIELD

This disclosure relates to a fiber-reinforced resin composition having dynamic characteristics as well as productivity and molding processability. The disclosure also relates to a fiber-reinforced composite material having excellent dynamic characteristics.

BACKGROUND

Fiber-reinforced resin compositions including a thermoplastic resin and reinforcing fibers are easily molded and processed by virtue of the characteristics of the thermoplastic resin, do not require a load in storage unlike thermosetting resins, and are excellent in recyclability. As these fiber-reinforced resin compositions, those in a variety of forms are known such as thermoplastic prepregs in which reinforcing fibers are arranged in the form of a sheet, and pellets in which reinforcing fibers are randomly dispersed. Fiber-reinforced resin compositions are excellent in balance between lightness and dynamic characteristics, and are therefore widely used as structural members of aircraft, automobiles, watercraft and the like, electronic equipment housings, sporting goods, and industrial materials such as building materials.

Among thermoplastic resins, a polyarylene sulfide is particularly excellent in heat resistance and chemical resistance so that a fiber-reinforced resin composition produced using the resin can be expected to be applied as an alternative to a metal material. However, when a fiber-reinforced resin composition produced using a polyarylene sulfide is developed as an alternative to a metal material, further improvement of the dynamic characteristics, particularly the tensile strength and elongation, of the fiber-reinforced resin composition is desired. This is because, since the tensile elongation of a general polyarylene sulfide is lower than the tensile elongation of reinforcing fibers (e.g. about 2% in the case of carbon fibers), the reinforcing effect of reinforcing fibers cannot be sufficiently utilized in the fiber-reinforced resin composition.

A general method of improving the tensile strength and elongation of a fiber-reinforced resin composition is enhancement of the elongation of a polyarylene sulfide to be used. However, tensile elongation of a polyarylene sulfide correlates to its molecular weight and hence its melt viscosity and, when the tensile elongation of the polyarylene sulfide is improved, the melt viscosity increases so that there is a risk of considerably impairing the molding processability of a fiber-reinforced resin composition. It is well known that it becomes harder to combine a polyarylene sulfide with reinforcing fibers as the melt viscosity of the polyarylene sulfide increases. In that case, it is necessary to make the process temperature higher, and therefore a polyarylene sulfide is not suitable to easily produce a fiber-reinforced resin composition with high productivity. For these reasons, it is an important technical challenge to improve the tensile strength and elongation while securing productivity and molding processability in a fiber-reinforced resin composition produced using a polyarylene sulfide.

Japanese Patent Laid-open Publication No. 2008-231291 discloses a molding material in which a high-molecular-weight thermoplastic resin is disposed in contact with a composite including a polyarylene sulfide prepolymer and continuous reinforcing fibers. In that molding material, a continuous reinforcing fiber bundle is impregnated with a low-molecular-weight material, and a high-molecular-weight material is used for a matrix resin so that dynamic characteristics as well as productivity are secured. The polyarylene sulfide prepolymer is an excellent material easily impregnated in a reinforcing fiber bundle to improve productivity of a molding material and easily dispersed in or made compatible with a matrix resin in a molding step to improve dispersion of reinforcing fibers in a molded article. However, the polyarylene sulfide prepolymer has a low molecular weight, and therefore has the problem that the added amount thereof and the dynamic characteristics of the resulting molded article are in a trade-off relationship.

On the other hand, various substances have been studied as additives to be added in a polyarylene sulfide. Japanese Patent Laid-open Publication No. 10-168290 discloses a composition in which a polyarylene sulfide, a cyclic polyolefin resin and a polycarbodiimide are combined to improve adhesion with a metal material and an organic material. For that composition, however, reinforcing fibers are intended to impart rigidity to the composition, and are not intended to improve dynamic characteristics such as the tensile strength and elongation of the fiber-reinforced resin composition, and it is not intended to secure those dynamic characteristics as well as productivity and molding processability.

Japanese Patent Laid-open Publication No. 2004-91504 discloses a composition including a polyarylene sulfide, an aromatic polycarbodiimide-based resin and an inorganic filler. However, that composition is intended to improve moisture resistance and chemical resistance without considerably deteriorating dynamic characteristics, and while the dynamic characteristics of the composition are disclosed, a phenomenon in which the tensile strength and elongation of the composition is dramatically improved is not conceived. Further, it is not intended to secure those dynamic characteristics as well as productivity and molding processability.

Fiber-reinforced composite materials (FRPs) are light and excellent in dynamic characteristics, and are widely used in electric and electronic device applications, civil engineering and building applications, machine and mechanism component applications, robot applications, two-wheeled vehicle and automobile applications and aerospace applications. As reinforcing fibers to be used in those FRPs, metal fibers such as aluminum fibers and stainless fibers, organic fibers such as aramid fibers and PBO fibers, inorganic fibers such as silicon carbide fibers, and carbon fibers are used, and carbon fibers are suitably used because they are excellent particularly in specific strength and specific rigidity, and ensure outstanding lightness.

Typical forms of FRPs such as carbon fiber-reinforced composite materials (CFRPs) include molded articles produced by press-molding a prepreg, or a preform obtained by laminating prepregs (a molding method in which a prepreg or preform is defoamed under a pressurizing force, and shaped). The prepreg is generally produced by a method in which a reinforcing fiber base material with continuous reinforcing fibers arranged in one direction or processed into a woven fabric is impregnated with a resin, but discontinuous reinforcing fibers may also be used.

The molded article obtained by molding a prepreg produced using continuous reinforcing fibers has excellent dynamic characteristics, but it is not suitable to form a complicated shape because the reinforcing fibers are used in the form of a continuous body, and the use applications of the molded article are limited due to economic burden of the lamination step because its characteristics are greatly influenced by the lamination angle of the prepreg.

On the other hand, sheet molding compounds (SMCs) and glass mat base materials (GMT) produced using discontinuous reinforcing fibers are materials suitable for press molding, but their use applications are limited due to the problem that their dynamic characteristics such as specific strength and specific rigidity are low, adaptation to a thin molded article such as a prepreg is difficult, the rein considerably flows during molding so that isotropic dynamic characteristics are not achieved, and characteristics considerably vary, or the like.

Bondability between reinforcing fibers and a matrix resin influences the dynamic characteristics such as the tensile strength of the fiber-reinforced composite material, and therefore design of an interface between the reinforcing fibers and the matrix resin is very important in development of the fiber-reinforced composite material.

Japanese Patent Laid-open Publication No. 5-106163 proposes carbon fibers with a carbodiimide reagent deposited on the surface, and describes that the carbon fibers are excellent in bondability to a thermoplastic resin as a matrix resin, leading to improvement of the bending strength, but there is a problem in terms of interfacial strength between the reinforcing fibers and the matrix resin, and it is desired to further improve the strength.

Further, Japanese Patent Laid-open Publication No. 5-311069 discloses a technique relating to a surface modifier for carbon fibers including an organic compound having two or more carbodiimide bonds in the molecule, and carbon fibers modified with the modifier, but similarly, there is a problem in terms of interfacial strength between the reinforcing fibers and the matrix resin, and it is desired to further improve the strength of the molded article.

Further, Japanese Patent Laid-open Publication No. 2005-239917 discloses a resin composition including an aliphatic polycarbodiimide-based resin as a polyarylene sulfide resin and fibers as an inorganic filler, but the tensile strength of the molded article is insufficient, and it is desired to further improve the strength.

It could therefore be helpful to provide a fiber-reinforced resin composition having dynamic characteristics such as the tensile strength and elongation as well as productivity and molding processability, to provide a fiber-reinforced composite material excellent in dynamic characteristics such as the tensile strength.

SUMMARY

We found that when in a specific composition a low-molecular-weight polyarylene sulfide is used as a matrix resin, the tensile strength and elongation of the resulting fiber-reinforced resin composition are dramatically improved.

Further, we found that by localizing an adhesive compound at the interfaces of reinforcing fibers, the abundance ratio of the adhesive compound on the circumference of the reinforcing fibers is controlled to improve bondability with the reinforcing fibers so that the tensile strength of the resulting fiber-reinforced composite material is dramatically improved.

We thus provide a fiber-reinforced resin composition including a polyarylene sulfide (A), a carbodiimide compound (B) and carbon fibers (C) and in which the carbon fibers (C) are surface-treated with a sizing agent (D), wherein the carbodiimide compound (B) is an aliphatic carbodiimide compound, the sizing agent (D) is a compound having, in one molecule, three or more functional groups of at least one type selected from the group consisting of a carboxyl group, an amino group, a hydroxyl group and an epoxy group, the fiber-reinforced resin composition contains 0.1 to 10 parts by mass of the component (B) and 10 to 300 parts by mass of the component (C) based on 100 parts by mass of the component (A), and 0.01 to 5 parts by mass of the component (D) based on 100 parts by mass of the component (C).

The molded article has the following configuration. Specifically, the molded article is a molded article formed by molding the fiber-reinforced resin composition.

Further, the fiber-reinforced composite material has any of the following configurations.

A fiber-reinforced composite material produced using the fiber-reinforced resin composition, wherein an abundance ratio Rb of the carbodiimide compound (B) is 1.2 or more, the abundance ratio Rb being given by formula (1):

$$Rb = R(\leq 500 \text{ nm})/R(>500 \text{ nm}) \qquad (1)$$

$R(\leq 500 \text{ nm})$: abundance of carbodiimide compound (B) within a distance of 500 nm from circumference of carbon fiber (C); and $R(>500 \text{ nm})$: abundance of carbodiimide compound (B) outside a distance of 500 nm from circumference of carbon fiber (C).

A fiber-reinforced composite material which includes a thermoplastic resin (A'), an adhesive compound (B') and reinforcing fibers (C') and in which the adhesive compound (B') is a compound having, in one molecule, two or more structures of at least one type selected from the group consisting of a carbodiimide structure, a urea structure and a urethane structure, the thermoplastic resin (A') is a thermoplastic resin containing an element other than carbon in a repeating unit structure of a main chain, and an abundance ratio Rb' of the adhesive compound (B') is 1.2 or more, the abundance ratio Rb' being given by formula (1'):

$$Rb' = R'(\leq 500 \text{ nm})/R'(>500 \text{ nm}) \qquad (1')$$

$R'(\leq 500 \text{ nm})$: abundance of adhesive compound (B') within a distance of 500 nm from circumference of reinforcing fiber (C'); and $R'(>500 \text{ nm})$: abundance of adhesive compound (B') outside a distance of 500 nm from circumference of reinforcing fiber (C').

In the fiber-reinforced resin composition, dynamic characteristics such as the tensile strength and elongation can be dramatically improved.

Further, dynamic characteristics are improved by using a low-molecular-weight polyarylene sulfide as a matrix resin so that a fiber-reinforced resin composition having dynamic characteristics as well as productivity and molding processability can be obtained.

Further, the molded article can be suitably used in various products because dynamic characteristics such as the tensile strength and elongation are dramatically improved.

In the fiber-reinforced composite material, dynamic characteristics such as the tensile strength can be dramatically improved because the interfacial strength between reinforcing fibers and a matrix resin is high.

DESCRIPTION OF REFERENCE SIGNS

Figure 1:
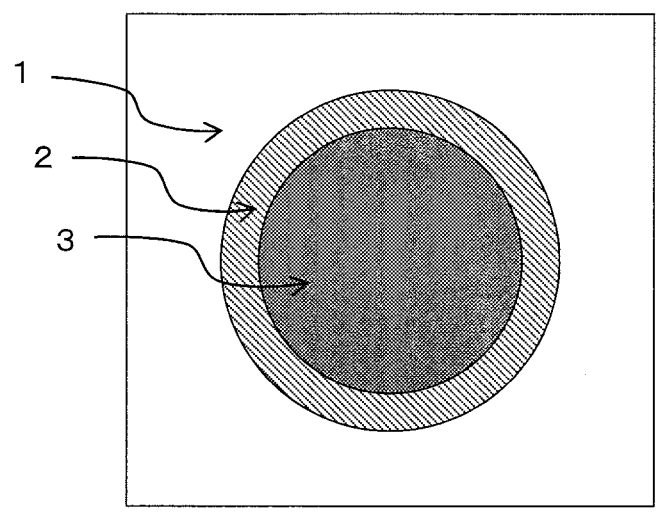
FIG. 1 is a schematic view showing one example of a morphology of a fiber-reinforced resin composition viewed at a cross section orthogonal to the axis center direction of a carbon fiber (C) monofilament.

1 Matrix resin containing polyarylene sulfide (A) and carbodiimide compound (B)
2 Region of surface of carbon fiber (C) where sulfur element concentration is low
3 Cross section of carbon fiber (C)
4 Cross section of carbon fiber (C)
5 Region (T1)
6 Region (T2)
7 Cross-sectional circle of carbon fiber (C); boundary line between carbon fiber (C) and region (T1)
8 One example of normal line extending outward from cross-sectional circle of carbon fiber (C)
9 Circle drawn at a distance of 500 nm in normal direction outward from cross-sectional circle of carbon fiber (C); boundary line between region (T1) and region (T2)
10 One example of normal line extending outward from region (T1)
11 Circle drawn at distance of 500 nm in normal direction outward from region (T1); boundary line of region (T2)
12 Reinforcing fiber monofilament
13 Region within a distance of 500 nm from circumference of reinforcing fiber (C')
14 Region outside a distance of 500 nm from circumference of reinforcing fiber (C')
15 Length from reinforcing fiber (C')

DETAILED DESCRIPTION

Our fiber-reinforced resin composition contains a polyarylene sulfide (A), a carbodiimide compound (B), carbon fibers (C) and a sizing agent (D) as components. First, the components will be described.

Polyarylene Sulfide (A)

The polyarylene sulfide (A) in the fiber-reinforced resin composition is a homopolymer or a copolymer having a repeating unit of the formula —(Ar—S)— as a main constituent unit and contains preferably 80 mol % or more, more preferably 90 mol % or more, further preferably 95 mol % or more of the repeating unit (hereinafter, the polyarylene sulfide will be sometimes abbreviated as PAS). Examples of Ar include units represented by formulae (a) to (k), and units represented by formula (a) are especially preferable.

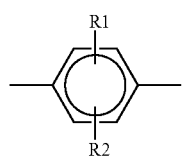
(a)

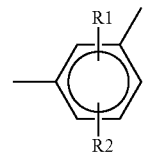
(b)

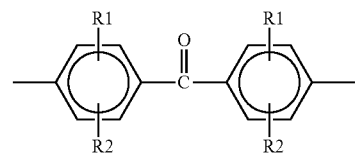
(c)

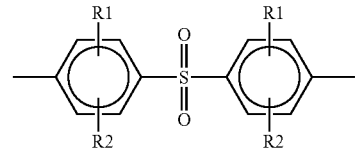
(d)

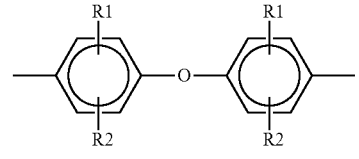
(e)

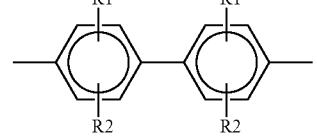
(f)

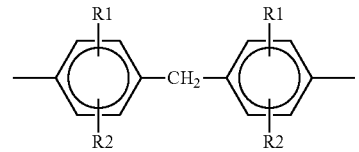
(g)

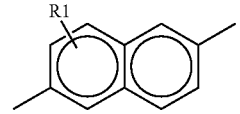
(h)

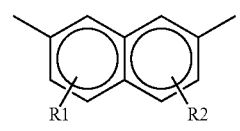
(i)

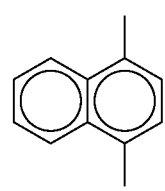
(j)

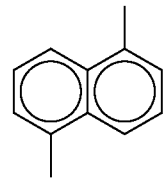
(k)

wherein R1 and R2 each represent a substituent selected from hydrogen, an alkyl group having 1 to 12 carbon atoms, an alkoxy group having 1 to 12 carbon atoms, an arylene group having 6 to 24 carbon atoms, and a halogen group, and R1 and R2 may be the same, or different.

As long as the polyarylene sulfide has the above-mentioned repeating unit as a main constituent unit, it may contain a small amount of branched units or crosslinked units represented by formulae (I) to (n). The copolymerization amount of branched units or crosslinked units is preferably 0 to 1 mol % based on 1 mol of the —(Ar—S)— unit.

The polyarylene sulfide (A) may be any of a random copolymer and a block copolymer including the above-mentioned repeating unit, and a mixture thereof.

Typical examples thereof include polyphenylene sulfides (formulae (a), (b) and (f) to (k)), polyphenylene sulfones (formula (d)), polyphenylene sulfide ketones (formula (c)), polyphenylene sulfide ethers (formula (e)), random copolymers and block copolymers thereof, and mixtures thereof. Examples of the particularly preferred polyarylene sulfide (A) include polyphenylene sulfides containing 80 mol % or more, particularly 90 mol % or more of a p-phenylene sulfide unit:

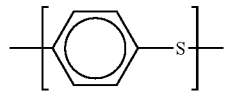

as a main constituent unit of the polymer (hereinafter, the polyphenylene sulfide will be sometimes abbreviated as a PPS).

The PAS (A) has a mass average molecular weight of preferably 10,000 to 80,000, more preferably 10,000 to 60,000, further preferably 10,000 to 40,000. It is preferable that the PAS (A) has a small mass average molecular weight, and hence a low melt viscosity because a fiber-reinforced resin composition excellent in molding processability is obtained.

When the PAS (A) in the fiber-reinforced resin composition has a small mass average molecular weight, the dynamic characteristics such as the tensile strength and elongation of the resulting fiber-reinforced resin composition tend to be improved. This may be because functional groups of the PAS (A) chemically react with carbodiimide groups of the carbodiimide compound (B), and a PAS (A) having a smaller mass average molecular weight has a larger number of functional groups at the end, and thus has a larger number of reaction points with the carbodiimide compound (B). For these reasons, it is especially preferable that the mass average molecular weight of the PAS (A) is 10,000 to 40,000 in the fiber-reinforced resin composition because the dynamic characteristics as well as productivity and molding processability of the resulting fiber-reinforced resin composition can be achieved at a high level.

The mass average molecular weight of the PAS (A) can be measured by size exclusion chromatography (SEC). The mass average molecular weight of the PAS can be determined by calculating the mass average molecular weight in terms of polystyrene with 1-chloronaphthalene used as an eluent and the column temperature set to 210° C.

Preferably, the PAS (A) has functional groups at the ends of the main chain and/or the side chain. The main chain refers to a chain structural part that is the longest in the polymer structure, and a part branched from the main chain is referred to as a side chain. The polymer structure refers to a part in which single structural units are repeatedly couples, or a part in which a plurality of structural units is regularly or randomly coupled, and the end refers to the last structural unit at which coupling is stopped. Preferably, functional groups of the PAS (A) exist at one or more of the ends of the main chain and/or the side chain in the polymer structure, and the ratio of PASs, which have such functional groups, to the PAS (A) is preferably 50% by mass or more, more preferably 60% by mass or more, further preferably 80% by mass or more. By satisfying such conditions, a fiber-reinforced resin composition having further excellent dynamic characteristics is obtained.

As the functional groups of the PAS (A), remaining functional groups of monomers used in polymerization, functional groups formed with a catalyst, auxiliary or solvent taken to the end during polymerization, functional groups with a polymer structure cut through thermal decomposition, hydrolysis or the like, and functional groups with the above-mentioned functional groups oxidized, reduced and modified with a modifier can be used. Examples of the modifier may include epichlorohydrin, polyfunctional epoxy resins and acid anhydrides. Among them, remaining functional groups of monomers used in polymerization, and functional groups formed with a catalyst, auxiliary or solvent taken to the end during polymerization are preferably used because damage to the polymer structure is small, and the molecular weight is easily controlled.

Examples of the functional group of the PAS (A) may include a thiol group, an epoxy group, a carboxyl group, metal salts of carboxyl groups, an amino group, a hydroxyl group, an isocyanate group, an oxazoline group and a sulfone group. Among these functional groups, a thiol group, an epoxy group, a carboxyl group, metal salts of carboxyl groups, an amino group, and a hydroxyl group are preferable from the viewpoint of reactivity with a carbodiimide group, and a thiol group, a carboxyl group, an amino group and a hydroxyl group are especially preferable.

In the PAS (A), the amount of oligomers extracted with chloroform is preferably 2% by mass or less, more preferably 1% by mass or less. The amount of oligomers extracted with chloroform serves as an index of the amount of organic low-polymerization components (oligomers), and can be calculated from the amount of residues at the time when 10 g of the PAS (A) to be measured is Soxhlet-extracted for 5 hours using 200 ml of chloroform. When the amount of oligomer components in the PAS (A) decreases, functional groups of polymer components in the PAS (A) and carbodiimide groups of the carbodiimide compound (B) can more selectively react with each other, and therefore a fiber-reinforced resin composition excellent in dynamic characteristics is obtained.

The PAS (A) can be produced with a high yield by recovering from a polymerization reaction product obtained by reacting a polyhalogenated aromatic compound with a sulfidation agent in a polar organic solvent, and post-treating the recovered PAS (A).

The polyhalogenated aromatic compound is a compound having two or more halogen atoms in one molecule. Specific examples thereof include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene and 1,4-diiodobenzene, 1-methoxy-2,5-dicyclobenzene. Among them, p-dichlorobenzene is preferably used. Two or more different polyhalogenated aromatic compounds can be combined to obtain a copolymer, but it is preferable that a p-dihalogenated aromatic compound is used as a main component.

The amount of the polyhalogenated aromatic compound may be, for example, 0.9 to 2.0 mol, preferably 0.95 to 1.5 mol, further preferably 1.005 to 1.2 mol per mol of the sulfidation agent for obtaining the PAS (A) having a mass average molecular weight suitable for processing.

Examples of the sulfidation agent include alkali metal sulfides, alkali metal hydrosulfides and hydrogen sulfide.

Specific examples of the alkali metal sulfide may include lithium sulfide, sodium sulfide, potassium sulfide, rubidium sulfide, cesium sulfide, and mixtures of two or more thereof, and among them, sodium sulfide is preferably used. These alkali metal sulfides can be used as a hydrate or an aqueous mixture, or in the form of an anhydride.

Specific examples of the alkali metal hydrosulfide may include sodium hydrosulfide, potassium hydrosulfide, lithium hydrosulfide, rubidium hydrosulfide, cesium hydrosulfide, and mixtures of two or more thereof, and among them, sodium hydrosulfide is preferably used. These alkali metal hydrosulfides can be used as a hydrate or an aqueous mixture, or in the form of an anhydride.

When a dehydration operation causes a partial loss of the sulfidation agent before a polymerization reaction is started in production of the PAS (A), the amount of the sulfidation agent to be added means a residual amount determined by subtracting the loss from the actual added amount.

An alkali metal hydroxide and/or an alkali earth metal hydroxide can be used in combination with the sulfidation agent. Specific examples of the preferred alkali metal hydroxide may include sodium hydroxide, potassium hydroxide, lithium hydroxide, rubidium hydroxide, cesium hydroxide and mixtures of two or more thereof. Specific examples of the alkali earth metal hydroxide include calcium hydroxide, strontium hydroxide and barium hydroxide. Among these alkali metal hydroxides and alkali earth metal hydroxides, sodium hydroxide is preferably used.

When an alkali metal hydrosulfide is used as the sulfidation agent, it is especially preferable to use an alkali metal hydroxide in combination, and the amount of the alkali metal hydroxide may be, for example, 0.95 to 1.20 mol, preferably 1.00 to 1.15 mol, further preferably 1.005 to 1.100 mol based on 1 mol of the alkali metal hydrosulfide.

Hereinafter, for one example of a method of producing the PAS (A), a pre-step, a polymerization reaction step, a recovery step and a post-treatment step will be described in detail in due order.

First, the pre-step will be described. The sulfidation agent is used usually in the form of a hydrate and it is preferable that before a polyhalogenated aromatic compound is added, a mixture containing an organic polar solvent and the sulfidation agent is heated to remove an excessive amount of water to outside the system. It is preferable that water is added to make up for shortage of water in case where water is excessively removed by this operation.

An alkali metal sulfide prepared from an alkali metal hydrosulfide and an alkali metal hydroxide in situ in the reaction system or in a tank different from a polymerization tank can also be used as the sulfidation agent. For desirable conditions to prepare an alkali metal sulfide, an alkali metal hydrosulfide and an alkali metal hydroxide are added to an organic polar solvent under an inert gas atmosphere at a temperature from normal temperature to 150° C., more preferably from normal temperature to 100° C., and the mixture is heated to 150° C. or more, more preferably 180 to 260° C., under normal pressure or reduced pressure to distill off water. A polymerization auxiliary may be added in this stage. To promote distillation of water, toluene or the like may be added to induce a reaction.

The amount of water in the polymerization system in polymerization reaction is preferably 0.5 to 10.0 mol per mol of the sulfidation agent to be added. The amount of water in the polymerization system is an amount determined by subtracting the amount of water removed to outside the polymerization system from the amount of water added in the polymerization system. The water to be added may be in the form of any of water, an aqueous solution, crystal water and so on. The amount of water is more preferably 0.75 to 2.5 mol, still more preferably 1.0 to 1.25 mol per mol of the sulfidation agent. To adjust the water content to fall within the above-mentioned range, water can be added before or during polymerization.

In the polymerization reaction step, the sulfidation agent and the polyhalogenated aromatic compound are reacted with each other in an organic polar solvent such as N-methyl-2-pyrrolidone at a temperature of not lower than 200° C. and not higher than 290° C. to generate the PAS (A).

In the start of the polymerization reaction step, the sulfidation agent and the polyhalogenated aromatic compound are added to the organic polar solvent at a temperature of from normal temperature to 220° C., preferably from 100 to 220° C. desirably under an inert gas atmosphere. A polymerization auxiliary such as sodium acetate may be added in this stage. The polymerization auxiliary means a substance having an action of adjusting the viscosity of the resulting PAS (A). These raw materials may be added in random order or at the same time.

The mixture is heated to a temperature of usually 200° C. to 290° C. The heating rate is not particularly limited, but a rate of usually 0.01 to 5° C./minute, more preferably 0.1 to 3° C./minute is selected.

The mixture is heated ultimately to a temperature of 250 to 290° C., and reacted at this temperature for 0.25 to 50 hours, preferably for 0.5 to 20 hours.

A method in which before reaching the ultimate temperature, the mixture is reacted at, for example, 200° C. to 245° C. for a fixed time, and then heated to 250 to 290° C. is effective to achieve a higher polymerization degree. The reaction time at 200° C. to 245° C. is selected usually within 0.25 hours to 20 hours, preferably within 0.25 to 10 hours.

In the recovery step after completion of the polymerization step, a solid material is recovered from the polymerization reaction product containing a polymer, a solvent and so on. Examples of the recovery method include a flash method, i.e., a method in which a polymerization reaction product is flashed from a high-temperature and high-pressure state (usually 245° C. or higher and 0.8 MPa or higher) into an atmosphere at usual pressure or reduced pressure to recover a polymer in a powdery form in parallel to recovery of a solvent, and a quenching method, i.e., a method in which a polymerization reaction product is gradually cooled from a high-temperature and high-pressure state to precipitate a PAS component in the reaction system, and separated by filtration at 70° C. or higher, preferably 100° C. or higher so that a solid containing the PAS component is recovered in a granular form.

The method of recovering the PAS (A) is not limited to one of the quenching method and the flash method, but the PAS (A) obtained by the quenching method is preferable because the content of oligomer components as represented by chloroform-extracted components is low, and a fiber-reinforced resin composition excellent particularly in tensile strength and elongation is obtained. The amount of oligomers extracted with chloroform in the PAS obtained by the quenching method may be, for example, 2% by mass or less, more preferably 1% by mass or less.

The PAS (A) is used after the solid material obtained by passing through the polymerization and recovery steps is subsequently subjected to a hot water treatment or washing with an organic solvent as the post treatment step. The solid material obtained by passing through the recovery step is commonly washed because it contains ionic impurities such as an alkali metal halide and an alkali metal organic substance which are polymerization by-products in addition to the PAS (A). As a washing liquid, for example, water or an organic solvent is used, and washing with water may be mentioned as an example of the preferred washing method in viewpoint of easily obtaining the PAS (A) at a low cost. As a type of water to be used, ion-exchanged water or distilled water is preferably used.

The washing temperature at the time of washing the solid material obtained by passing through the recovery step is preferably not lower than 50° C. and not higher than 200° C., more preferably not lower than 150° C. and not higher than 200° C., further preferably not lower than 180° C. and not higher than 200° C. The operation for the treatment with a liquid at 100° C. or higher is performed usually by adding to a predetermined amount of a liquid the solid content obtained by passing through the recovery step, and heating and stirring the mixture at normal pressure or in a pressure vessel. Washing may be performed over a plurality of times, and the washing temperature may be different in each washing process, but to obtain the PAS (A) having a reduced amount of ionic impurities, it is practical to perform washing at least once, preferably two or more times at a temperature of 150° C. or higher, and it is preferable that a filtration step of separating a polymer and a washing liquid is provided between the washing processes.

When washing is performed in preparation of the PAS (A), a washing additive may be used and the washing additive may be, for example, an acid, an alkali metal salt or an alkali earth metal salt. When an acid is used, it is preferable that an acidic aqueous solution is prepared by adding an organic acid, an inorganic acid or the like to water to be used for washing, a PAS to be washed is immersed in the aqueous solution, and heated and washed in such a manner that the aqueous solution after the washing has a pH of 2 to 8. Examples of the organic acid or inorganic acid may include, but are not limited to, acetic acid, propionic acid, hydrochloric acid, sulfuric acid, phosphoric acid and formic acid, with acetic acid and hydrochloric acid being preferable. The PAS (A) obtained using an acid as a washing additive is referred to as an acid end product. When an alkali metal salt or an alkali earth metal salt is used as the washing additive, for example, a method may be used in which a PAS to be washed is immersed in an aqueous solution prepared by adding an alkali metal salt or an alkali earth metal salt to water to be used for washing. The amount of the alkali metal salt or alkali earth metal salt is preferably 0.01 to 5% by mass, further preferably 0.1 to 0.7% by mass based on the amount of the PAS (A). Examples of the alkali metal salt or alkali earth metal salt may include, but are not limited to, calcium salts, potassium salts, sodium salts and magnesium salts of the above-mentioned organic acids or inorganic acids.

The washing additive may be used in any stage of the washing step, but to efficiently perform washing with a small amount of the additive, a method is preferably used in which a solid material recovered in the recovery step is washed with water over several times, and a PAS to be washed is then immersed in an aqueous solution containing a washing additive, and treated at 150° C. or higher. The ratio of the washing liquid to the PAS in washing is preferably large, but usually such a ratio that preferably 10 to 500 g, further preferably 50 to 200 g of the PAS (A) is immersed in 1 liter of the washing liquid is selected.

The PAS (A) thus obtained is dried under normal pressure and/or reduced pressure. The drying temperature is preferably 120 to 280° C., more preferably 140 to 250° C. The drying atmosphere may be an inert atmosphere such as that of nitrogen or helium or an atmosphere under reduced pressure, an oxidizing atmosphere such as that of oxygen or air, or an atmosphere of mixed air and nitrogen, but an inert atmosphere is preferable in view of the melt viscosity. The drying time is preferably 0.5 to 50 hours, more preferably 1 to 30 hours, further preferably 1 to 20 hours.

Carbodiimide Compound (B)

The carbodiimide compound (B) is an aliphatic carbodiimide compound. When as the carbodiimide compound (B), one other than an aliphatic carbodiimide compound, for example, an aromatic carbodiimide compound is used, the fiber-reinforced resin composition cannot be obtained. This may be because carbodiimide groups of the aromatic carbodiimide compound have lower reactivity with functional groups of the PAS (A) than carbodiimide groups of the aliphatic carbodiimide compound.

The aliphatic carbodiimide compound is a homopolymer or a copolymer having as a main constituent unit a repeating unit represented by the general formula —N=C=N—$R_3$— (wherein $R_3$ represents a divalent organic group of a cycloaliphatic compound such as cyclohexylene, or a divalent organic group of an aliphatic compound such as methylene, ethylene, propylene or methylethylene) and contains preferably 70 mol % or more, more preferably 90 mol % or more, further preferably 95 mol % or more of the repeating unit.

The method of synthesizing an aliphatic carbodiimide compound is not particularly limited, and the aliphatic carbodiimide compound can be synthesized by, for example, reacting an organic polyisocyanate in the presence of a catalyst that accelerates the carbodiimidation reaction of isocyanate groups (hereinafter, also referred to as a "carbodiimidation catalyst").

The organic polyisocyanate to be used for synthesis of the aliphatic carbodiimide compound is preferably an organic diisocyanate. Examples of the organic diisocyanate may include cyclobutylene-1,3-diisocyanate, cyclopentylene-1,3-diisocyanate, cyclohexylene-1,3-diisocyanate, cyclohexylene-1,4-diisocyanate, 1-methylcyclohexylene-2,4-diisocyanate, 1-methylcyclohexylene-2,6-diisocyanate, 1-isocyanate-3,3,5-trimethyl-5-isocyanate methylcyclohexane, cyclohexane-1,3-bis(methylisocyanate), cyclohexane-1,4-bis(methylisocyanate), dicyclohexylmethane-2,4'-diisocyanate, dicyclohexylmethane-4,4'-diisocyanate, ethylene diisocyanate, tetramethylene-1,4-diisocyanate, hexamethylene-1,6-diisocyanate, dodecamethylene-1,12-diisocyanate, lysine diisocyanate methyl ester and the like, and prepolymers with isocyanate at both ends obtained by reacting a stoichiometrically excessive amount of any of these organic diisocyanates with a difunctional active hydrogen-containing compound. These organic diisocyanates may be used alone, or used in combination of two or more thereof.

Examples of other organic polyisocyanates optionally used together with the organic diisocyanate may include tri-or-more functional organic polyisocyanates such as cyclohexane-1,3,5-triisocyanate, cyclohexane-1,3,5-tris(methylisocyanate), 3,5-dimethylcyclohexane-1,3,5-tris(methylisocyanate), 1,3,5-trimethylcyclohexane-1,3,5-tris(methylisocyanate), dicyclohexylmethane-2,4,2'-triisocyanate and dicyclohexylmethane-2,4,4'-triisocyanate, and prepolymers with isocyanate on the end obtained by reacting a stoichiometrically excessive amount of any of these tri-or-more functional group organic polyisocyanates with a di-or-more functional active hydrogen-containing compound.

The other organic polyisocyanates may be used alone, or used in combination of two or more thereof. The amount thereof is preferably 0 to 40 parts by mass, more preferably 0 to 20 parts by mass based on 100 parts by mass of the organic diisocyanate.

Further, in synthesis of an aliphatic carbodiimide compound, the molecular weight of the resulting aliphatic carbodiimide compound can be appropriately controlled by adding an organic monoisocyanate as necessary.

Examples of the organic monoisocyanate may include alkyl monoisocyanates such as methyl isocyanate, ethyl isocyanate, n-propyl isocyanate, n-butyl isocyanate, lauryl isocyanate and stearyl isocyanate, and cycloalkyl monoisocyanates such as cyclohexyl isocyanate, 4-methylcyclohexyl isocyanate and 2,5-dimethylcyclohexyl isocyanate.

These organic monoisocyanates may be used alone or used in combination of two or more thereof, and the amount thereof varies depending on a desired molecular weight of the aliphatic carbodiimide compound, but it is preferably 0 to 40 parts by mass, more preferably 0 to 20 parts by mass based on 100 parts by mass of the organic polyisocyanate component.

Examples of the carbodiimidation catalyst may include 1-phenyl-2-phospholene-1-oxide, 1-phenyl-3-methyl-2-phospholene-1-oxide, 1-phenyl-2-phospholene-1-sulfide, 1-phenyl-3-methyl-2-phospholene-1-sulfide, 1-ethyl-2-phospholene-1-oxide, 1-ethyl-3-methyl-2-phospholene-1-oxide, 1-ethyl-2-phospholene-1-sulfide, 1-ethyl-3-methyl-2-phospholene-1-sulfide, 1-methyl-2-phospholene-1-oxide, 1-methyl-3-methyl-2-phospholene-1-oxide, 1-methyl-2-phospholene-1-sulfide, 1-methyl-3-methyl-2-phospholene-1-sulfide, phospholene compounds such as 3-phospholene isomers thereof, metal carbonyl complexes such as pentacarbonyliron, nonacarbonyldiiron, tetracarbonylnickel, hexacarbonyltungsten and hexacarbonylchromium, acetylacetone complexes of metals such as beryllium, aluminum, zirconium, chromium and iron, and phosphoric acid esters such as trimethyl phosphate, triethyl phosphate, triisopropyl phosphate, tri-t-butyl phosphate and triphenyl phosphate.

The carbodiimidation catalysts may be used alone, or in combination of two or more thereof. The amount of the catalyst is preferably 0.001 to 30 parts by mass, more preferably 0.01 to 10 parts by mass based on 100 parts by mass of the organic polyisocyanate component.

The temperature in the aliphatic carbodiimide compound synthesis reaction is appropriately selected according to the types of the organic polyisocyanate, organic monoisocyanate and carbodiimidation catalyst, but it is usually 20 to 200° C. In the aliphatic carbodiimide compound synthesis reaction, the organic polyisocyanate and organic monoisocyanate components may be all added before the reaction, or partially or totally added continuously or stepwise during the reaction.

A compound capable of reacting with isocyanate groups is added in an appropriate reaction stage between the initial stage and the late stage of the aliphatic carbodiimide compound synthesis reaction to block the terminal isocyanate groups of the aliphatic carbodiimide compound, whereby the molecular weight of the resulting aliphatic carbodiimide compound can be controlled, or the compound capable of reacting with isocyanate groups is added in the late stage of the aliphatic carbodiimide compound synthesis reaction, whereby the molecular weight of the resulting aliphatic carbodiimide compound can be regulated to a predetermined value. Examples of the compound capable of reacting with isocyanate groups may include alcohols such as methanol, ethanol, isopropanol and cyclohexanol, and amines such as dimethylamine, diethylamine and benzylamine.

The aliphatic carbodiimide compound has a mass average molecular weight of preferably 500 to 10,000, more preferably 1,000 to 5,000. When the mass average molecular weight of the aliphatic carbodiimide compound is in this range, both the improvement of dynamic characteristics such as the tensile strength and elongation as the desired effect and achieving productivity and molding processability can be achieved at a high level. The mass average molecular weight of the aliphatic carbodiimide compound can be determined by an analysis method such as SEC (size exclusion chromatography).

Carbon Fibers (C)

As the carbon fibers (C), polyacrylonitrile (PAN)-based carbon fibers, pitch-based carbon fibers, rayon-based carbon fibers and the like can be used, and two or more types of these fibers may be used in combination.

The carbon fibers (C) preferably have a tensile strength of 2,000 MPa or more, more preferably 3,000 MPa or more, further preferably 4,000 MPa or more. The carbon fibers (C) preferably have a tensile elastic modulus of not less than 200 GPa and not more than 700 GPa. Further, the carbon fibers (C) preferably have a tensile elongation of 0.5% or more, more preferably 1.0% or more, further preferably 1.8% or more, especially preferably 2.0% or more. It is especially preferable that carbon fibers (C) having a high elongation is used because improvement of the dynamic characteristics such as the tensile strength and elongation, of the fiber-reinforced resin composition can be achieved at a high level. PAN-based carbon fibers are preferably used as the carbon fibers (C) from the viewpoint of balance among the tensile strength, the tensile elastic modulus and the tensile elongation.

The carbon fibers (C) have a surface oxygen concentration ratio (O/C) of preferably 0.05 to 0.50, more preferably 0.08 to 0.40, further preferably 0.10 to 0.30, the surface oxygen concentration ratio being a ratio of the number of atoms of oxygen (O) to carbon (C) on the fiber surface as measured by X-ray photoelectron spectroscopy (XPS). Higher the surface oxygen concentration ratio (O/C), larger the number of functional groups on the carbon fiber surface so that bondability between carbon fibers (C) and the sizing agent (D) can be improved, but when the surface oxygen concentration ratio (O/C) is excessively high, the crystal structure of the carbon fiber surface may be ruptured, and therefore a fiber-reinforced resin composition particularly excellent in dynamic characteristics can be obtained when the surface oxygen concentration ratio (O/C) is in the preferred range.

The surface oxygen concentration ratio (O/C) of the carbon fibers (C) is determined in accordance with the following procedure by X-ray photoelectron spectroscopy. First, the carbon fibers (C) freed of the sizing agent (D) or the like by a solvent are cut, and spread and arranged on a sample supporting stand made of copper, the photoelectron escape angle is then set to 90°, and the inside of a sample chamber is kept at $1\times10^{-8}$ Torr with $MgK_{\alpha1,2}$ used as an X-ray source. The kinetic energy value (K.E.) at the main peak of C1S is matched to 969 eV as a correction of a peak associated with charging during measurement. The C1S peak area is determined by drawing a straight baseline of 958 to 972 eV as K.E. The O1S peak area is determined by drawing a straight baseline of 714 to 726 eV as K.E. The surface oxygen concentration ratio (O/C) is calculated as the ratio of the number of atoms from the ratio of the O1S peak area and the C1S peak area using an apparatus-specific sensitivity correction value.

The method of controlling the surface oxygen concentration ratio (O/C) is not particularly limited and, for example, methods such as an electrolytic oxidation treatment, a chemical oxidation treatment and a gas phase oxidation treatment can be employed, with the electrolytic oxidation treatment being preferable.

The average fiber diameter of the carbon fibers (C) is not particularly limited, but it is preferably 1 to 20 μm, more preferably 3 to 15 μm from the viewpoint of the dynamic characteristics and surface external appearance of the resulting fiber-reinforced resin composition.

The carbon fibers (C) may be used as a carbon fiber bundle with a plurality of monofilaments bundled together from the viewpoint of handling characteristics. The number of monofilaments that form the carbon fiber bundle is preferably not less than 100 and not more than 350,000, more preferably not less than 1,000 and not more than 250,000, further preferably not less than 10,000 and not more than 100,000 from the viewpoint of handling characteristics. When the number of monofilaments that form the carbon fiber bundle is in the above-mentioned range, the fiber-reinforced resin composition is obtained with high economic efficiency.

Sizing Agent (D)

The sizing agent (D) is a compound having, in one molecule, three or more functional groups of at least one type selected from the group consisting of a carboxyl group, an amino group, a hydroxyl group and an epoxy group. Two or more of types of the functional groups may exist in one molecule, or two or more compounds having three or more functional groups of one type in one molecule may be used in combination. When only a compound in which the number of the functional groups in one molecule is less than 3 is used, reaction points between the compound and the surface functional groups of the carbon fibers (C) or the carbodiimide compound (B) are insufficient so that the dynamic characteristics such as the tensile strength and elongation, of the resulting fiber-reinforced resin composition are deteriorated. Therefore, it is absolutely necessary that a compound constituting the sizing agent (D) have three or more functional groups in one molecule. A functional group other than the above-mentioned functional groups, for example, an alkoxysilane is poor in reactivity with the carbon fiber surface, and therefore when a silane coupling agent having one alkoxysilane and one epoxy group in one molecule is used for the sizing agent (D), a fiber-reinforced resin composition excellent in dynamic characteristics as intended is not obtained.

The compound that constitutes the sizing agent (D) is preferably an aliphatic compound. The aliphatic compound here is an acyclic linear saturated hydrocarbon, a branched saturated hydrocarbon, an acyclic linear unsaturated hydrocarbon, a branched unsaturated hydrocarbon, or a compound of chain structure in which a carbon atom ($CH_3$, $CH_2$, CH or C) in the hydrocarbon is replaced by an oxygen atom (O), a nitrogen atom (NH or N) or a carbonyl atom group (CO). The aliphatic compound does not have a cyclic structure such as an aromatic ring. It is preferable that the sizing agent (D) is an aliphatic compound because affinity with an aliphatic carbodiimide compound used as the carbodiimide compound (B) is improved so that a fiber-reinforced resin composition excellent in dynamic characteristics is obtained.

Specific examples of the compound that constitutes the sizing agent (D) include polyfunctional epoxy resins, acrylic acid-based polymers, polyhydric alcohols and polyethyleneimine, and above all, polyfunctional epoxy resins having high reactivity with both the surface functional groups of the carbon fibers (C) and the carbodiimide compound (B) are preferable.

Examples of the polyfunctional epoxy resin include tri-or-more functional aliphatic epoxy resins and phenol novolac-type epoxy resins. Among them, tri-or-more functional aliphatic epoxy resins are preferable from the viewpoint of affinity with the aliphatic carbodiimide compound. The tri-or-more functional aliphatic epoxy resin means an aliphatic epoxy resin having three or more epoxy groups in one molecule.

Specific examples of the tri-or-more functional aliphatic epoxy resin include polyglycidyl ethers of aliphatic polyhydric alcohols such as glycerol triglycidyl ether, diglycerol polyglycidyl ether, polyglycerol polyglycidyl ether, sorbitol polyglycidyl ether, arabitol polyglycidyl ether, trimethylolpropane triglycidyl ether and pentaerythritol polyglycidyl ether. Among these aliphatic epoxy resins, glycerol triglycidyl ether, diglycerol polyglycidyl ether and polyglycerol polyglycidyl ether are preferably used because they contain a large number of epoxy groups having high reactivity in one molecule, have high water solubility, and are easily applied to the carbon fibers (C).

The acrylic acid-based polymer is a generic name of polymers which are polymers of acrylic acid, methacrylic acid and maleic acid, and contain three or more carboxyl groups in one molecule. Specific examples of the acrylic acid-based polymer include polyacrylic acids, copolymers of acrylic acid and methacrylic acid, copolymers of acrylic acid and maleic acid, and mixtures of two or more thereof. Further, the acrylic acid-based polymer may be one with the carboxyl group partially neutralized with an alkali (i.e. formed into a carboxylate) as long as the number of functional groups as described above is 3 or more in one molecule. Examples of the alkali include alkali metal hydroxides such as sodium hydroxide, lithium hydroxide and potassium hydroxide, and ammonium hydroxide. As the acrylic acid-based polymer, a polyacrylic acid containing a larger number of carboxyl groups in one molecule is preferably used.

Specific examples of polyhydric alcohol include polyvinyl alcohol, glycerol, diglycerol, polyglycerol, sorbitol, arabitol, trimethylolpropane and pentaerythritol. As the polyhydric alcohol, a polyvinyl alcohol containing a larger number of hydroxyl groups in one molecule is preferably used.

The polyethyleneimine is a polyamine obtained by ring-opening polymerization of ethylene imine, and has a branched structure formed by primary, secondary and tertiary amino groups. As the polyethyleneimine, a polyethyleneimine containing a larger number of amino groups in one molecule is preferably used.

In the compound that constitutes the sizing agent (D), the value obtained by dividing the mass average molecular weight of the compound by the number of the above-described functional groups (the total number of carboxyl groups, amino groups, hydroxyl groups and epoxy groups) in one molecule is preferably 40 to 150. When the above-mentioned value is in such a range, the density of reaction points with the surface functional groups of the carbon fibers (C) and the carbodiimide group of the carbodiimide compound (B) in the compound that constitutes the sizing agent (D) can be made more uniform so that the dynamic characteristics such as the tensile strength and elongation, of the resulting fiber-reinforced resin composition can be further improved.

Preferably, the fiber-reinforced resin composition has the sizing agent (D) at the interface between the matrix resin containing the PAS (A) and the carbodiimide compound (B) and the carbon fibers (C). Accordingly, the sizing agent (D) is applied to the surfaces of carbon fiber (C) monofilaments. By adding the sizing agent (D) to the carbon fibers (C) beforehand, the surfaces of the carbon fibers (C) can be effectively modified even with a small deposition amount.

The fiber-reinforced resin composition is required to contain the sizing agent (D) in an amount of 0.01 to 5 parts by mass, preferably 0.1 to 2 parts by mass based on 100 parts by mass of the carbon fibers (C). When the content of the sizing agent (D) is less than 0.01 part by mass, it may be unable to sufficiently cover the surfaces of the carbon fibers (C) with the sizing agent (D) so that the effect of improving the dynamic characteristics such as the tensile strength and elongation of the resulting fiber-reinforced resin composition is hard to be exhibited. When the content of the sizing agent (D) is more than 5 parts by mass, the thickness of a film formed on the surfaces of the carbon fibers (C) by the sizing agent (D) may excessively increase, resulting in deterioration of the dynamic characteristics such as the tensile strength and elongation of the resulting fiber-reinforced resin composition. The preferred range of the thickness of a film formed on the surfaces of the carbon fibers (C) by the sizing agent (D) may be, for example, from 10 to 150 nm.

Examples of the method of adding the sizing agent (D) to the carbon fibers (C) include a method in which the carbon fibers (C) are immersed in the sizing agent (D) via a roller, and a method in which the sizing agent (D) is atomized, and sprayed to the carbon fibers (C). It is preferable that the sizing agent (D) is diluted with a solvent or the temperature, the yearn tension or the like is controlled when the sizing agent is added so that the deposition amount of the sizing agent (D) on the carbon fibers (C) becomes more uniform. Examples of the solvent that dilute the sizing agent (D) include water, methanol, ethanol, dimethylformamide, dimethylacetamide and acetone, and water is preferable from the viewpoint of ease of handling and disaster prevention. The solvent is evaporated by heating and removed after the sizing agent (D) is added to the carbon fibers (C). When a compound insoluble or hardly soluble in water is used as the sizing agent (D), it is preferable that the compound is dispersed in water with an emulsifier or surfactant added thereto. As the emulsifier or surfactant, anionic emulsifiers, cationic emulsifiers, nonionic emulsifiers and the like can be used. Among them, nonionic emulsifiers which have low interactivity are preferably used because they hardly hinder the effect of the sizing agent (D). Fiber-reinforced resin composition The fiber-reinforced resin composition is required to contain the carbodiimide compound (B) in an amount of 0.1 to 10 parts by mass, preferably 0.1 to 5 parts by mass based on 100 parts by mass of the PAS (A). When the content of the carbodiimide compound (B) is less than 0.1 part by mass, the amount of the carbodiimide compound (B) is not sufficient and thus the effect of improving the dynamic characteristics such as the tensile strength and elongation, of the resulting fiber-reinforced resin composition is not exhibited. When the content of the carbodiimide compound (B) is more than 10 parts by mass, conversely, the amount of the carbodiimide compound (B) is excessively large and thus the dynamic characteristics such as the tensile strength and elongation, of the resulting fiber-reinforced resin composition are deteriorated.

The fiber-reinforced resin composition is required to contain the carbon fibers (C) in an amount of 10 to 300 parts by mass, preferably 10 to 200 parts by mass, more preferably 20 to 100 parts by mass, further preferably 20 to 50 parts by mass based on 100 parts by mass of the PAS (A). When the content of the carbon fibers (C) is less than 10 parts by mass, the amount of the carbon fibers (C) is not sufficient and thus the effect of improving the dynamic characteristics such as the tensile strength and elongation, of the resulting fiber-reinforced resin composition is not exhibited. When the content of the carbon fibers (C) is more than 300 parts by mass, it is difficult to combine the carbon fibers (C) with the matrix resin containing the PAS (A) and the carbodiimide compound (B), resulting in deterioration of the dynamic characteristics such as the tensile strength and elongation, of the resulting fiber-reinforced resin composition.

In the fiber-reinforced resin composition, the carbodiimide compound (B) forms the matrix resin with the PAS (A), and the sizing agent (D) is used for surface treatment of the carbon fibers (C). When a specific combination of the carbodiimide compound (B) and the sizing agent (D) with the carbodiimide compound (B) being an aliphatic carbodiimide compound and the sizing agent (D) being a compound having, in one molecule, three or more functional groups of at least one type selected from the group consisting of a carboxyl group, an amino group, a hydroxyl group and an epoxy group is used, the dynamic characteristics such as the tensile strength and elongation, of the resulting fiber-reinforced resin composition can be dramatically improved. This may be because the interfacial shear strength between the PAS (A) and the carbon fibers (C) is specifically improved by ensuring that the specific carbodimide compound (B) and specific sizing agent (D) having high reactivity react, respectively, with the PAS (A) and carbon fibers (C) having a small number of functional groups, and hence low reactivity, and further, the carbodiimide compound (B) and the sizing agent (D) react with each other.

Further, in the PAS (A), when the molecular weight decreases, the number of functional groups existing at the ends increases, leading to an increase in the number of reaction points with the carbodiimide compound (B). We believe that even when the PAS (A) has a small mass average molecular weight and a low melt viscosity and low elongation, reactivity with the carbodiimide compound (B) is increased so that the effect of improving the interfacial shear strength becomes remarkable and, as a result, a fiber-reinforced resin composition having dynamic characteristics such as the tensile strength and elongation as well as productivity and molding processability as the desired effect can be obtained.

In the fiber-reinforced resin composition, the carbodiimide compound (B) only needs to be eventually dispersed in or made compatible with the PAS (A), but it is more preferable that the fiber-reinforced resin composition has a morphology in which the carbodiimide compound (B) is aggregated over a certain degree on the surfaces of the carbon fibers (C) surface-treated with the sizing agent (D). As an indicator to analyze the morphology, mention may be made of, for example, a method using a sulfur concentration ratio S/C measured by energy dispersive X-ray spectroscopy (EDX) based on a difference between sulfur element contents of the PAS (A) and the carbodiimide compound (B).

FIG. 1 schematically shows an example in which the fiber-reinforced resin composition is observed at a cross section orthogonal to the axis center direction of the carbon fiber (C) monofilament. A region 2 on the outer periphery of a cross section 3 of the carbon fiber (C), where the sulfur element concentration is low, is composed of a region where the ratio of the carbodiimide compound (B) is high in a matrix resin 1 containing the PAS (A) and the carbodiimide compound (B), and the sizing agent (D) covering the surface of the carbon fiber (C).

In the fiber-reinforced resin composition, it is preferable that the sulfur concentration ratio S/C measured by energy dispersive X-ray spectroscopy (EDX) satisfies the following formula:

$$10(\%) \leq \Delta S = (S2 - S1)/S2 \times 100 \leq 70(\%)$$

wherein $\Delta S$ represents a gradient of the sulfur element concentration viewed at a cross section orthogonal to the axis center direction of the carbon fiber (C), S1 represents a sulfur concentration ratio S/C in a region (T1) remaining after excluding the component (C) from the inside of a circle drawn at a distance of 500 nm in the normal direction outward from the cross-sectional circle of the component (C), and S2 represents a sulfur concentration ratio S/C in a region (T2) remaining after excluding the component (C) and the region (T1) from the inside of a circle drawn at a distance of 500 nm in the normal direction outward from the region (T1).

The $\Delta S$ is an indicator of the interfacial state. The lower limit of $\Delta S$ is 10%, more preferably 20%, further preferably 30%. When $\Delta S$ is less than the lower limit, aggregation of the carbodiimide compound (B) on the carbon fibers (C) may not be sufficient to contribute to improvement of the dynamic characteristics such as the tensile strength and elongation of the resulting fiber-reinforced resin composition. The upper limit of $\Delta S$ is 70%, more preferably 60%, further preferably 50%. When $\Delta S$ is more than the upper limit, aggregation of the carbodiimide compound (B) on the carbon fibers (C) may be excessive, resulting in deterioration of the dynamic characteristics such as the tensile strength and elongation of the resulting fiber-reinforced resin composition.

Figure 2:
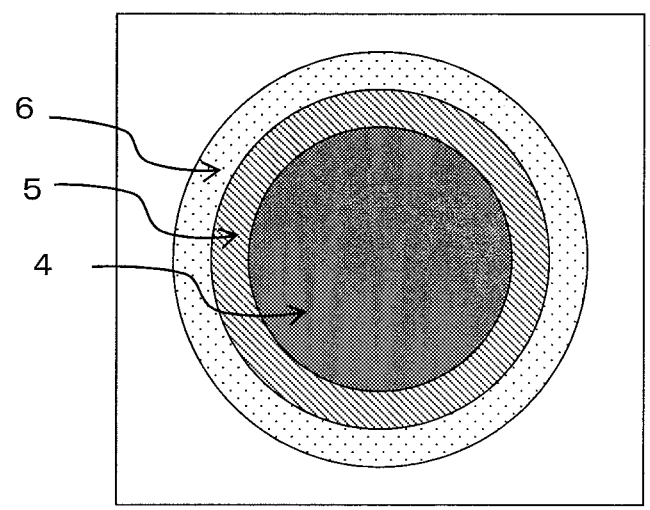
FIG. 2 is a schematic view showing one example of a region (T1) and a region (T2) in a fiber-reinforced resin composition viewed at a cross section orthogonal to the axis center direction of a carbon fiber (C) monofilament.

FIG. 2 schematically shows an example in which the fiber-reinforced resin composition is observed at a cross section orthogonal to the axis center direction of the carbon fiber (C) monofilament. A region (T1) 5 exists outside a cross section 4 of the carbon fiber (C) in the form of a concentric circle, and a region (T2) 6 exists outside the region (T1) 5 in the form of a concentric circle.

Figure 3:
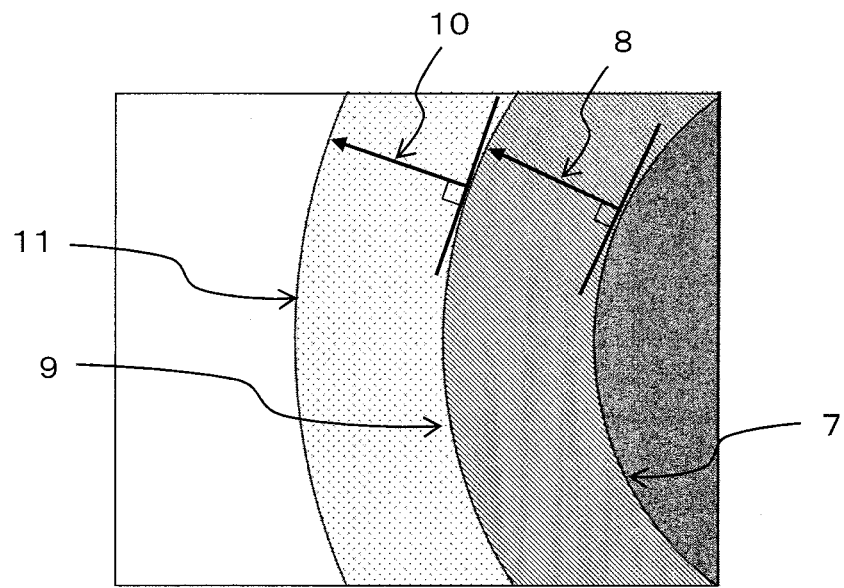
FIG. 3 is a schematic view showing one example of a region (T1) and a region (T2) in a fiber-reinforced resin composition viewed at a cross section orthogonal to the axis center direction of a carbon fiber (C) monofilament.

FIG. 3 schematically shows an example in which a cross section orthogonal to the axis center direction of the carbon fiber (C) monofilament in the fiber-reinforced resin composition is enlarged in the vicinity of the outer periphery of the carbon fiber (C) and observed.

In the fiber-reinforced resin composition, the sulfur concentration ratio S/C in the region (T2), measured by energy dispersive X-ray spectroscopy (EDX), is preferably 0.05 to 0.45, more preferably 0.1 to 0.4, further preferably 0.1 to 0.2. When the sulfur concentration ratio S/C in the region (T2) is in the above-mentioned range, the high elastic modulus of the PAS (A) can be efficiently exhibited so that the resulting fiber-reinforced resin composition is further excellent in dynamic characteristics such as the tensile strength and elongation.

In a fiber-reinforced composite material produced using the fiber-reinforced resin composition, the abundance ratio Rb of the carbodiimide compound (B), which is given by formula (1), is preferably 1.2 or more, and from the viewpoint of interfacial bonding between the carbon fibers (C) and the carbodiimide compound (B), the abundance ratio Rb is more preferably 1.5 or more.

$$Rb = R(\leq 500 \text{ nm})/R(>500 \text{ nm}) \qquad (1)$$

$R(\leq 500 \text{ nm})$: abundance of carbodiimide compound (B) within a distance of 500 nm from circumference of carbon fiber (C); and $R(>500 \text{ nm})$: abundance of carbodiimide compound (B) outside a distance of 500 nm from circumference of carbon fiber (C).

When the abundance ratio Rb is less than 1.2, interfacial bonding between the carbon fibers (C) and the carbodiimide compound (B) is deteriorated, and the dynamic characteristics of the fiber-reinforced composite material, particularly the tensile strength that influences interfacial bonding may be deteriorated.

To control the degree of aggregation of the carbodiimide compound (B) on the surfaces of the carbon fibers (C), the abundance ratio Rb is preferably 10 or less, more preferably 5 or less, further preferably 3.5 or less.

The abundance ratio Rb can be calculated in the following manner using, for example, energy dispersive X-ray spectroscopy (EDX). The number of carbon atoms and the number of sulfur atoms in a predetermined range are detected, the obtained number of carbon atoms is divided by the number of sulfur atoms to determine a carbon concentration ratio C/S in this range, and this value is measured in the vicinity of the carbon fiber (C) for R ($\leq 500$ nm) (e.g. C/S in the region (T1)) and R ($>500$ nm) (e.g. C/S in the region (T2)), and substituted into formula (1).

The fiber-reinforced resin composition containing the PAS (A), the carbodiimide compound (B), the carbon fibers (C) and the sizing agent (D) are configured such that the carbon fibers (C) surface-treated with the sizing agent (D) exist in a matrix resin containing the PAS (A) and the carbodiimide compound (B). The carbon fibers (C) may be randomly dispersed or oriented in one direction or multiple directions in the resulting fiber-reinforced resin composition. When the carbon fibers (C) are randomly dispersed, there is the advantage that the resulting fiber-reinforced resin composition is further excellent in molding processability, and when the carbon fibers (C) are oriented in one direction or multiple directions, there is the advantage that the resulting fiber-reinforced resin composition is further excellent in dynamic characteristics.

When the carbon fibers (C) in the fiber-reinforced resin composition are randomly dispersed, the fiber length of the carbon fibers (C) in the fiber-reinforced resin composition is preferably 0.01 to 5 mm, more preferably 0.01 to 3 mm, further preferably 0.05 to 1 mm in terms of a number average fiber length. When the fiber length is in the above-mentioned range, fluidity is improved so that further excellent molding processability is achieved. The dynamic characteristics such as the tensile strength and elongation of the resulting fiber-reinforced resin composition are improved as the fiber length increases, and therefore the fiber length is preferably long.

When the carbon fibers (C) in the fiber-reinforced resin composition are oriented in one direction or multiple directions, dynamic characteristics are improved as the fiber length of the carbon fibers (C) increases. The upper limit of the fiber length of the carbon fibers (C) may be, for example, substantially the same length as that of the fiber-reinforced resin composition.

The phrase "substantially the same length" means that carbon fibers (C) significantly shorter than the full length of the fiber-reinforced resin composition are not substantially included. Specifically, when the content of carbon fibers (C) having a length equal to or less than 50% of the full length of the fiber-reinforced resin composition is 30% by mass or less to the entire carbon fibers (C), it is determined that carbon fibers (C) significantly shorter than the full length of the fiber-reinforced resin composition are not substantially included. Further, the content of carbon fibers (C) having a length equal to or less than 50% of the full length of the fiber-reinforced resin composition is preferably 20% by mass or less. The full length of the fiber-reinforced resin composition is a length in the orientation direction of the carbon fibers (C) in the fiber-reinforced resin composition.

As one example of the method of producing such a fiber-reinforced resin composition, mention may be made of a method in which melting and kneading is performed using an extruder. The extruder may be, for example, a single-screw extruder or twin-screw extruder, and particularly, a twin-screw extruder excellent in kneadability can be preferably used. The twin-screw extruder may be, for example, one having an L/D ratio of 20 to 100 where L is a screw length and D is a screw diameter. The screw of the twin-screw extruder is formed by combining screw segments having different lengths and shape features such as a full-flight and a kneading disc, and it is preferable that the screw includes one or more kneading discs for improvement of kneadability and reactivity. As a melting and kneading condition, the cylinder temperature in melting and kneading is preferably 250 to 400° C., more preferably 280 to 350° C., further preferably 280 to 310° C. for improvement of kneadability and reactivity. When a twin-screw extruder having such a configuration is used, reactions between functional groups of the components proceed in the cylinder of the twin-screw extruder so that the dynamic characteristics such as the tensile strength and elongation of the resulting fiber-reinforced resin composition are further improved.

The first method of producing the fiber-reinforced resin composition using the extruder is a method in which the carbon fibers (C) surface-treated with the sizing agent (D), the PAS (A) and the carbodiimide compound (B) are melted and kneaded. In this method, a melted and kneaded product in which the carbon fibers (C) are randomly dispersed is obtained and the melted and kneaded product is formed into a pellet and suitably used for injection molding. When molding is performed by injection molding, a molded article having a complicated shape can be produced with high productivity.

The second method of producing the fiber-reinforced resin composition using the extruder is a method in which a resin composition obtained by melting and kneading the PAS (A) and the carbodiimide compound (B) beforehand is combined with a carbon fiber base material including the carbon fibers (C) surface-treated with the sizing agent (D). Examples of the form of the carbon fiber base material include unidirectionally arranged base materials in which continuous carbon fibers are unidirectionally arranged to form a sheet, woven fabrics (cloths), nonwoven fabrics, mats, knitted fabrics, braids, yarns and tows. Examples of the method of combining the resin composition with the carbon fiber base material include impregnation, covering and lamination, and it is preferable to impregnate the carbon fiber base material with the resin composition because a fiber-reinforced resin composition having few voids or the like and being excellent in dynamic characteristics such as the tensile strength and elongation is obtained. The fiber-reinforced resin composition can be molded into a molded article by press molding, stamping molding, autoclave molding, filament winding molding, transfer molding or injection molding. Particularly, press molding and stamping molding are preferably employed from the viewpoint of balance between productivity and dynamic characteristics of the molded article.

Further, we examined the local abundance of an adhesive compound in the fiber-reinforced composite material, and found that the abundance of the adhesive compound on a specific region in the fiber-reinforced composite material influences the dynamic characteristics of the fiber-reinforced composite material, leading to the fiber-reinforced composite material.

The fiber-reinforced composite material contains reinforcing fibers (C'), an adhesive compound (B') and a thermoplastic resin (A') as components. First, the components will be described.

Examples of the reinforcing fibers (C') that can be used in the fiber-reinforced composite material include carbon fibers, glass fibers, aramid fibers, alumina fibers, silicon carbide fibers, boron fibers, metal fibers, natural fibers and mineral fibers, and one type of these fibers, or a combination of two or more types of these fibers may be used. Among them, carbon fibers such as PAN-based, pitch-based and rayon-based carbon fibers are preferably used because they have a high specific strength and high specific rigidity so that a weight reducing effect is obtained. To improve the economic efficiency of the resulting molded article, glass fibers can be preferably used, and particularly, it is preferable to use carbon fibers and glass fibers in combination from the viewpoint of balance between dynamic characteristics and economic efficiency. To improve the impact absorptivity and shapability of the resulting molded article, aramid fibers can be preferably used, and particularly, it is preferable to use carbon fibers and aramid fibers in combination from the viewpoint of balance between dynamic characteristics and impact absorptivity. To improve the conductivity of the resulting molded article, reinforcing fibers coated with a metal such as nickel, copper or ytterbium can be used.

The carbon fibers have a surface oxygen concentration ratio (O/C) of preferably 0.05 to 0.50, more preferably 0.08 to 0.40, further preferably 0.10 to 0.30, the surface oxygen concentration ratio being a ratio of the number of atoms of oxygen (O) to carbon (C) on the fiber surface as measured by X-ray photoelectron spectroscopy (XPS). Higher the surface oxygen concentration ratio (O/C), larger the number of functional groups on the carbon fiber surface so that bondability between carbon fibers and the sizing agent can be improved, but when the surface oxygen concentration ratio (O/C) is excessively high, the crystal structure of the carbon fiber surface may be ruptured, and therefore a fiber-reinforced composite material that is particularly excellent in dynamic characteristics can be obtained when the surface oxygen concentration ratio (O/C) is in the preferred range.

The surface oxygen concentration ratio (O/C) of the carbon fibers can be measured in the same manner as in the surface oxygen concentration ratio (O/C) of the carbon fibers (C) described above.

The method of controlling the surface oxygen concentration ratio (O/C) is not particularly limited and, for example, methods such as an electrolytic oxidation treatment, a chemical oxidation treatment and a gas phase oxidation treatment can be employed, with the electrolytic oxidation treatment being preferable.

The average fiber diameter of the reinforcing fibers (C') is not particularly limited, but it is preferably 1 to 20 pin, more preferably 3 to 15 μm from the viewpoint of the dynamic characteristics and surface external appearance of the resulting fiber-reinforced composite material.

The reinforcing fibers (C') may be used as a reinforcing fiber bundle with a plurality of monofilaments bundled together from the viewpoint of handling characteristics. The number of monofilaments that form the reinforcing fiber bundle is preferably not less than 100 and not more than 350,000, more preferably not less than 1,000 and not more than 250,000, further preferably not less than 10,000 and not more than 100,000 from the viewpoint of handling characteristics. When the number of monofilaments that form the reinforcing fiber bundle is in the above-mentioned range, the fiber-reinforced composite material is obtained with high economic efficiency.

The number average fiber length of the reinforcing fibers (C') is preferably 0.1 mm to 50 mm. The number average fiber length of the reinforcing fibers (C') is further preferably 0.1 mm to 20 mm from the viewpoint of the moldability of the fiber-reinforced composite material.

Examples of the method of measuring the number average fiber length include a method in which resin components contained in the fiber-reinforced composite material are removed by a dissolution method or a burn-off method, the remaining reinforcing fibers are separated by filtration, and a measurement is then made by microscope observation, and a method in which the fiber-reinforced composite material is stretched and made thin by a melting method, and the reinforcing fibers are transparently observed to make a measurement. In the measurement, 400 reinforcing fibers are randomly selected, the lengths thereof are measured to a unit of 1 μm using an optical microscope, and the number average fiber length is calculated from $\Sigma Li/400$ (Li: measured fiber length (i=1, 2, 3, . . . , 400)). There is no significant difference between the result obtained using the method in which reinforcing fibers are extracted from the fiber-reinforced composite material by a burn-off method or a dissolution method and the result obtained using the method in which the molded article is stretched and made thin by a melting method, and the reinforcing fibers are transparently observed.

Preferably, a compound having, in one molecule, two or more functional groups of at least one type selected from the group consisting of a carboxyl group, a hydroxyl group, an amino group and an epoxy group (hereinafter, abbreviated as compound (E)) is deposited on the reinforcing fibers (C') to further improve bondability of the reinforcing fibers (C') in the fiber-reinforced composite material. Two or more of types of the functional groups may exist in one molecule, or two or more compounds having two or more functional groups of one type in one molecule may be used in combination. The compound (E) is preferably an aliphatic compound. It is preferable that the compound (E) is an aliphatic compound because affinity with the reinforcing fibers (C') and the adhesive compound (B') is improved so that a fiber-reinforced composite material excellent in dynamic characteristics is obtained.

Specific examples of the compound (E) include polyfunctional epoxy resins, acrylic acid-based polymers, polyhydric alcohols and polyethyleneimine, and above all, polyfunctional epoxy resins having high reactivity with both the surface functional groups of the reinforcing fibers (C') and the adhesive compound (B') are preferable.

Examples of the polyfunctional epoxy resin, acrylic acid-based polymer, polyhydric alcohol and polyethylene imine may include the same compounds as described above as specific examples of the compound that constitutes the sizing agent (D).

In the compound (E), the value obtained by dividing the mass average molecular weight of the compound by the number of the above-described functional groups (the total number of carboxyl groups, hydroxyl groups, amino groups and epoxy groups) in one molecule is preferably 40 to 150. When the above-mentioned value is in such a range, the density of reaction points with the surface functional groups of the reinforcing fibers (C') and the functional groups of the adhesive compound (B') can be made more uniform so that the dynamic characteristics such as the tensile strength of the resulting fiber-reinforced composite material can be further improved.

When the compound (E) is used in the fiber-reinforced composite material, the content thereof is preferably 0.01 to 5 parts by mass, more preferably 0.1 to 2 parts by mass based on 100 parts by mass of the reinforcing fibers (C') to efficiently improve the strength of the fiber-reinforced composite material.

The method of depositing the compound (E) on the reinforcing fibers (C') may be, for example, a method in which the compound (E) is added as a sizing agent for the reinforcing fibers (C'). The method in which the compound (E) is added as a sizing agent for the reinforcing fibers (C') may be, for example, one that is the same as the above-mentioned method in which the sizing agent (D) is added to the carbon fibers (C) except that the sizing agent (D) is replaced by the compound (E) and the carbon fibers (C) are replaced by the reinforcing fibers (C').

The adhesive compound (B') to be used in the fiber-reinforced composite material is required to be a compound having, in one molecule, two or more structures of at least one type selected from the group consisting of a carbodiimide structure, a urea structure and a urethane structure, and particularly a polycarbodiimide is preferably used from the viewpoint of interfacial bonding with the reinforcing fibers.

Examples of the polycarbodiimide include aliphatic polycarbodiimides and aromatic polycarbodiimides, and aliphatic polycarbodiimides are preferably used from the viewpoint of reactivity with a thermoplastic resin.

As the aliphatic polycarbodiimide, the same compound as described above as the aliphatic carbodiimide compound that forms the carbodiimide compound (B) can be used.

As the adhesive compound (B') having a urea structure, one obtained by reacting a diisocyanate with a diamine including a compound containing a plurality of amino groups (e.g. hydrazine, dihydrazide or the like) can be used.

Alternatively, a polyurea which is the adhesive compound (B') having a plurality of urea structures can be synthesized by reacting an isocyanate with water to form unstable carbamic acid. The carbamic acid is decomposed to generate carbon dioxide and forms amino groups that immediately react with an isocyanate to form a urea bridge. Alternatively, the polyurea is obtained by treating a compound having a carbodiimide structure with water to react the carbodiimide into urea.

As the adhesive compound (B') having a urethane structure, one obtained by reacting bischloroformate with diamine can be used. Alternatively, a polyurethane which is the adhesive compound (B') having a plurality of urethane structures can be synthesized by reacting a diisocyanate with a diol such as a macroglycol, a polyol, or a combination of a macroglycol and a single-chain glycol extending agent.

The adhesive compound (B') has a mass average molecular weight of preferably 500 to 10,000, more preferably 1,000 to 5,000. It is supposed that when the mass average molecular weight of the adhesive compound (B') is in this range, the adhesive compound (B') relatively easily flows during heating and melting in molding or the like, and does not flow so much that it is diffused to the extent that bonding is hindered, and therefore the adhesive compound (B') is easily localized on the circumference of the reinforcing fibers (C') so that improvement of dynamic characteristics such as the tensile strength as the desired effect is achieved at a high level. The mass average molecular weight of the adhesive compound (B') can be determined by an analysis method such as SEC (size exclusion chromatography).

The thermoplastic resin (A') to be used in the fiber-reinforced composite material is required to contain an element other than carbon in the repeating unit structure of the main chain to improve polarity to increase affinity with the reinforcing fibers (C' and the adhesive compound (B') and, more specifically, the thermoplastic resin (A') is preferably at least one thermoplastic resin selected from the group consisting of a polycarbonate, a polyester, a polyarylene sulfide, a polyamide, a polyoxymethylene, a polyether imide, a polyether ketone and a polyether ether ketone from the viewpoint of interfacial bonding with the reinforcing fibers (C') and moldability of the fiber-reinforced composite material. Preferably, the thermoplastic resin (A') has, in the molecule, at least one functional group of at least one type selected from the group consisting of a carboxyl group, a hydroxyl group and an amino group from the viewpoint of bondability with the reinforcing fibers (C') and the adhesive compound (B').

The thermoplastic resin (A') has a mass average molecular weight of preferably 10,000 to 80,000, more preferably 10,000 to 60,000, further preferably 10,000 to 40,000. It is preferable that the thermoplastic resin (A') has a small mass average molecular weight, and hence a low melt viscosity because a fiber-reinforced composite material excellent in molding processability is obtained.

When the thermoplastic resin (A') in the fiber-reinforced composite material has a small mass average molecular weight, the dynamic characteristics such as the tensile strength of the resulting fiber-reinforced composite material tend to be improved. This may be because functional groups of the thermoplastic resin (A') chemically react with functional groups of the adhesive compound (B'), and a thermoplastic resin (A') having a smaller mass average molecular weight has a relatively larger number of functional groups at the end, and thus has a larger number of reaction points with the adhesive compound (B'). This effect is remarkable especially when a PAS having low bondability to the reinforcing fibers (C') is used as the thermoplastic resin (A'). For these reasons, it is especially preferable that the mass average molecular weight of the thermoplastic resin (A') is 10,000 to 40,000 in the fiber-reinforced composite material because the dynamic characteristics of the resulting fiber-reinforced composite material can be achieved at a high level while molding processability is secured.

The mass average molecular weight of the thermoplastic resin (A') can be measured by size exclusion chromatography (SEC). In SEC, the mass average molecular weight of the thermoplastic resin (A') is calculated as a mass average molecular weight in terms of polystyrene.

The fiber-reinforced composite material contains the adhesive compound (B') in an amount of preferably 0.1 to 10 parts by mass, further preferably 0.1 to 5 parts by mass based on 100 parts by mass of the thermoplastic resin (A'). It is preferable that the content of the adhesive compound (B') is in the above-mentioned range, because the content in this range is sufficient to improve affinity between the reinforcing fibers (C') and the thermoplastic resin (A'), and ensures a proper blending amount of the adhesive compound (B') in the thermoplastic resin (A') so that influence on costs is small, and thus the dynamic characteristics of the fiber-reinforced composite material can be efficiently improved. When the content of the adhesive compound (B') is less than 0.1 part by mass, the amount of the adhesive compound (B') is not sufficient, and thus the effect of improving the dynamic characteristics such as the tensile strength of the resulting fiber-reinforced composite material may be small. When the content of the adhesive compound (B') is more than 10 parts by mass, the amount of the adhesive compound (B') is excessively large, and thus the effect of improving the dynamic characteristics such as the tensile strength of the resulting fiber-reinforced composite material may be small.

The fiber-reinforced composite material preferably contains the reinforcing fibers (C') in an amount of 10 to 300 parts by mass, further preferably 10 to 200 parts by mass, more preferably 20 to 100 parts by mass, still further preferably 20 to 50 parts by mass based on 100 parts by mass of the thermoplastic resin (A'). When the content of the reinforcing fibers (C') is less than 10 parts by mass, the amount of the reinforcing fibers (C') is not sufficient, and thus the effect of improving the dynamic characteristics such as the tensile strength of the resulting fiber-reinforced composite material may be small. When the content of the reinforcing fibers (C') is more than 300 parts by mass, it becomes more difficult to combine the reinforcing fibers (C') with the matrix resin containing the thermoplastic resin (A') and the adhesive compound (B') and, as a result, the dynamic characteristics such as the tensile strength of the resulting fiber-reinforced composite material may be small.

In the fiber-reinforced composite material, the abundance ratio Rb' of the adhesive compound (B'), which is given by formula (1'), is required to be 1.2 or more, and from the viewpoint of interfacial bonding between the reinforcing fibers (C') and the adhesive compound (B'), the abundance ratio Rb' is preferably 1.5 or more.

$$Rb'=R'(\leq 500 \text{ nm})/R'(>500 \text{ nm}) \qquad (1')$$

R'(≤500 nm): abundance of adhesive compound (B') within a distance of 500 nm from circumference of reinforcing fiber (C'); and R'(>500 nm): abundance of adhesive compound (B') outside a distance of 500 nm from circumference of reinforcing fiber (C').

When the abundance ratio Rb' is less than 1.2, interfacial bonding between the reinforcing fibers (C') and the adhesive compound (B') is deteriorated, and the dynamic characteristics of the fiber-reinforced composite material, particularly the tensile strength that influences interfacial bonding are deteriorated.

To control the degree of aggregation of the adhesive compound (B') on the surfaces of the reinforcing fibers (C'), the abundance ratio Rb' is preferably 10 or less, further preferably 5 or less, more preferably 3.5 or less.

The abundance ratio Rb' can be calculated in the following manner using, for example, energy dispersive X-ray spectroscopy (EDX), X-ray photoelectron spectroscopy (XPS) or time-of-flight secondary ion mass spectrometry (TOF-SIMS). Characteristic elements (nitrogen atoms, oxygen atoms and so on) and molecules contained in the adhesive compound (B'), and bonding states thereof are measured in the vicinity of the reinforcing fiber (C') for R' (≤500 nm) and R' (>500 nm), and a ratio of the obtained values is determined. The abundance at each location can be known by mapping the abundance ratio.

Figure 4:
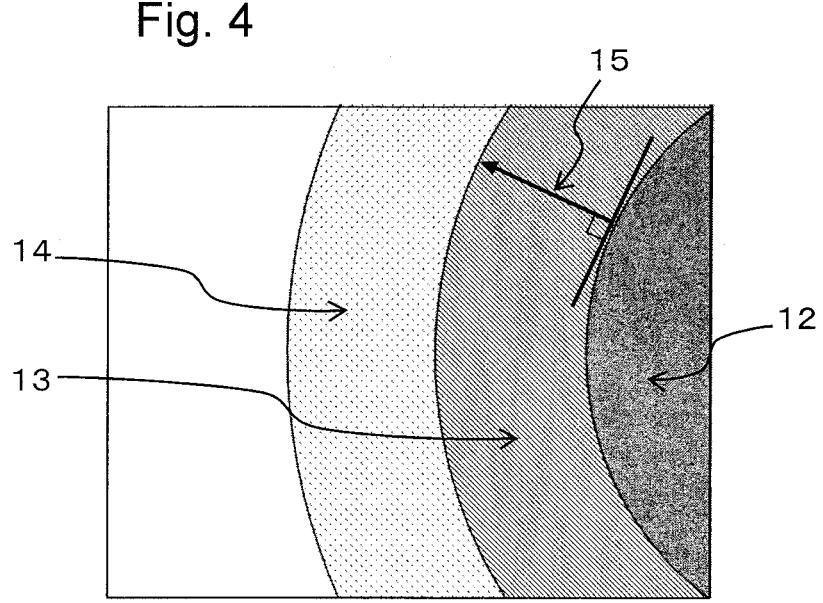
FIG. 4 is a schematic view showing one example of a cross section orthogonal to the axis center direction of a carbon fiber (C') monofilament in a fiber-reinforced composite material.

FIG. 4 schematically shows an example in which the fiber-reinforced composite material is observed at a cross section orthogonal to the axis center direction of the contained reinforcing fiber (C') monofilament. A region on the outer periphery of a cross section of the reinforcing fiber (C') (reinforcing fiber monofilament 12 in FIG. 4), where the abundance of the adhesive compound (B') is high (within a distance of 500 nm from the circumference of the reinforcing fiber (C') in FIG. 4), is composed of a region where the ratio of the adhesive compound (B') is high in the matrix resin containing the adhesive compound (B') and the thermoplastic resin (A'). A region where the abundance of the adhesive compound (B') is low (region 14 outside a distance of 500 nm from the circumference of the reinforcing fiber (C') in FIG. 4) is composed of a region where the ratio of the thermoplastic resin (A') is high in the matrix resin containing the adhesive compound (B') and the thermoplastic resin (A'). The distance of 500 nm from the circumference of the reinforcing fiber (C') means that the length of a straight line drawn vertically from tangential line of the reinforcing fiber (C') (length 15 from the reinforcing fiber (C') in FIG. 4) is 500 nm. To more accurately perform the measurement in energy dispersive X-ray spectroscopy (EDX), X-ray photoelectron spectroscopy (XPS), time-of-flight secondary ion mass spectrometry (TOF-SIMS) or the like, for example, the fiber-reinforced composite material is measured at a cross section prepared with a gradient angle made with respect to a cross section orthogonal to the axis center direction of the reinforcing fiber (C') monofilament. By doing so, a large measurement site area can be provided.

As one example of the method of producing the fiber-reinforced composite material, mention may be made of a method in which melting and kneading is performed using an extruder.

As the extruder, the same extruder as described above in specific examples of producing the fiber-reinforced resin composition is used under the same melting and kneading conditions as described above. When a twin-screw extruder having such a configuration is used, reactions between functional groups of the components proceed in the cylinder of the twin-screw extruder so that the dynamic characteristics such as the tensile strength of the resulting fiber-reinforced composite material are further improved.

The first method of producing the fiber-reinforced composite material using the extruder is a method in which the reinforcing fibers (C'), the adhesive compound (B') and the thermoplastic resin (A') are melted and kneaded. Further, it is preferable to select a method in which at the time of melting and kneading the reinforcing fibers (C'), the adhesive compound (B') and the thermoplastic resin (A'), the thermoplastic resin (A') and the adhesive compound (B') are melted and kneaded, and then combined with the reinforcing fibers (C'). In this configuration, diffusion of the adhesive compound (B') into the thermoplastic resin (A') is more easily controlled as compared to a method in which the thermoplastic resin (A') is melted and kneaded, and then combined with the adhesive compound (B') and the reinforcing fibers (C'), and aggregation of the adhesive compound (B') on the surfaces of the reinforcing fibers (C') is more easily controlled as compared to a method in which the thermoplastic resin (A') and the reinforcing fibers (C') are melted and kneaded, and then combined with the adhesive compound (B') so that a fiber-reinforced composite material having a controlled abundance ratio Rb' is produced with high productivity.

The method in which at the time of melting and kneading the reinforcing fibers (C'), the adhesive compound (B') and the thermoplastic resin (A'), the thermoplastic resin (A') and the adhesive compound (B') are melted and kneaded, and then combined with the reinforcing fibers (C') may be, for example, a method in which an extruder is main-fed with the thermoplastic resin (A') and the adhesive compound (B'), and side-fed with the reinforcing fibers (C').

Further preferable may be, for example, a method in which the reinforcing fibers (C') are added as early as possible. It is preferable that the reinforcing fibers (C') are early added because the reinforcing fibers (C') come close to the adhesive compound (B') through a reaction or interaction, and thus the adhesive compound (B') is localized over a distance of 500 nm or less from the circumference of the reinforcing fibers (C') so that in the fiber-reinforced composite material, the interfacial strength between the reinforcing fibers (C') and the adhesive compound (B') can be increased to improve dynamic characteristics such as the tensile strength. Accordingly, the position at which the extruder is side-fed may be, for example, at 20 to 70%, preferably 20 to 50% of a distance between the position at which the extruder is main-fed and the discharge port of the extruder. Further, by lowering the cylinder temperature of the extruder to make it hard for the adhesive compound (B') to flow in melting, diffusion of the fiber-reinforced composite material in the matrix resin can be controlled to localize the adhesive compound (B') on the circumference of the reinforcing fibers (C'). In this method, a melted and kneaded product in which the reinforcing fibers (C') are randomly dispersed is obtained, and the melted and kneaded product is formed into a pellet, and suitably used for injection molding. When molding is performed by injection molding, a molded article having a complicated shape can be produced with high productivity. Further, by lowering the cylinder temperature to make it hard for the adhesive compound (B') to flow in melting, diffusion of the fiber-reinforced composite material in the matrix resin can be controlled to localize the adhesive compound (B') on the circumference of the reinforcing fibers (C') in injection molding as well.

The second method of producing the fiber-reinforced composite material using the extruder is a method in which a resin composition obtained by melting and kneading the adhesive compound (B') and the thermoplastic resin (A') beforehand is combined with a fiber base material including the reinforcing fibers (C'). When the adhesive compound (B') and the thermoplastic resin (A') are mixed beforehand, the adhesive compound (B') is simply kneaded with the thermoplastic resin (A') without reacting with the thermoplastic resin (A') at the time of combining the resin composition with the reinforcing fibers (C'). Accordingly, the reinforcing fibers (C') come close to the adhesive compound (B') through a reaction or interaction, and thus the adhesive compound (B') is localized over a distance of 500 nm or less from the circumference of the reinforcing fibers (C') so that in the fiber-reinforced composite material, the interfacial strength between the reinforcing fibers (C') and the adhesive compound (B') can be increased to improve dynamic characteristics such as the tensile strength. Examples of the form of the fiber base material include unidirectionally arranged base materials in which continuous reinforcing fibers are unidirectionally arranged to form a sheet, woven fabrics (cloths), nonwoven fabrics, mats, knitted fabrics, braids, yarns and tows. Examples of the method of combining the resin composition with the fiber base material include impregnation, covering and lamination, and it is preferable to impregnate the fiber base material with the resin composition because a fiber-reinforced composite material having few voids or the like and being excellent in dynamic characteristics such as the tensile strength and elongation is obtained. The fiber-reinforced composite material can be molded by press molding, stamping molding, autoclave molding, filament winding molding or transfer molding, or molded by injection molding when it is in the form of a finely cut base material. Particularly, press molding, stamping molding and injection molding are preferably employed from the viewpoint of balance between productivity and dynamic characteristics of the molded article.

Other Additives

The fiber-reinforced resin composition and the fiber-reinforced composite material may contain an impact resistance improving agent such as an elastomer or a rubber component, and other fillers and additives as long as the desired effect is not impaired. Examples of the additives include flame retardants, conductivity imparting agents, nucleating agents, ultraviolet absorbers, antioxidants, vibration controlling agents, antibacterial agents, insect repellents, deodorants, coloration preventing agents, heat stabilizers, mold release agents, antistatic agents, plasticizers, lubricants, colorants, pigments, dyes, foaming agents and antifoaming agents.

Product produced using fiber-reinforced resin composition and product produced using fiber-reinforced composite material The fiber-reinforced resin composition and the fiber-reinforced composite material are suitable as electronic device housings, and are suitably used in computers, televisions, cameras, audio players and the like.

The fiber-reinforced resin composition and the fiber-reinforced composite material are suitable in electric and electronic component applications, and are suitably used in connector, LED lamps, sockets, optical pickups, terminal plates, printed boards, speakers, small motors, magnetic heads, power modules, power generators, electric motors, transformers, current transformers, voltage regulators, rectifiers, inverters and the like.

The fiber-reinforced resin composition and the fiber-reinforced composite material are suitable for automobile components, vehicle related components and so on, and are suitably used in safety belt components, instrument panels, console boxes, pillars, roof rails, fenders, bumpers, door panels, roof panels, hood panels, trunk lids, door mirror stays, spoilers, hood louvers, wheel covers, wheel caps, garnishes, intake manifolds, fuel pumps, engine cooling water joints, wind washer nozzles, wipers, battery peripheral components, wire harness connectors, lamp housings, lamp reflectors, lamp sockets and the like.

The fiber-reinforced resin composition and the fiber-reinforced composite material are suitable as building materials, and are suitably used in wall, roof and ceiling material related components, window material related components, heat insulator material related components, floor material related components, base isolation vibration damping member related components, lifeline related components and the like in civil engineering and construction products.

The fiber-reinforced resin composition and the fiber-reinforced composite material are suitable as sporting goods, and are suitably used in golf related goods such as golf club shafts and golf balls, sports racket related goods such as tennis rackets and badminton rackets, body protection goods for sports such as masks, helmets, chest protectors, elbow pads and kneepads in American football, baseball, softball and the like, fishing tackle related goods such as fishing rods, reels and fishing lures, winter sports related goods such as skis and snowboards, and the like.

EXAMPLES

Our compositions and composite materials will be described further in detail below by way of examples.

First, evaluation methods will be described below.

(1) Average Fiber Length of Carbon Fibers (C) Contained in Fiber-Reinforced Resin Composition A part of a fiber-reinforced resin composition was cut out and heating-pressed at 300° C. to obtain a 30 μm-thick film. The obtained film was observed with an optical microscope at a magnification of 150, and fibers dispersed in the film were observed. The lengths of the fibers were measured to a unit of 1 μm, and the number average fiber length (Ln) and the mass average fiber length (Lw) were determined from the following equation.

Number average fiber length $(Ln)=(\Sigma Li)/Ntotal$

Mass average fiber length $(Lw)=\Sigma(Li \times Wi/100)$

Li: measured fiber length (i=1, 2, 3, . . . , n).

Wi: mass fraction of fibers having a fiber length Li (i=1, 2, 3, . . . , n).

Ntotal: total number of fibers subjected to measurement of fiber length.

(2) Density of Fiber-Reinforced Resin Composition

A measurement was made in conformity with Method A (under water substitution method) in JIS K7112. About 3 g of a test piece was cut out from a fiber-reinforced resin composition, and ethanol was used as an immersion liquid to perform evaluation.

(3) Tension Test of Fiber-Reinforced Resin Composition and Fiber-Reinforced Composite Material In conformity with ASTM D638, a Type-I test piece was used, and "INSTRON (registered trademark)" Universal Tester Model (manufactured by Instron, Ltd.) was used as a tester. The tensile elongation refers to a breakage point strain measured using a strain gauge.

(4) Charpy Impact Test of Fiber-Reinforced Resin Composition

In conformity with Method B in ASTM D256, a Charpy impact test was conducted using a notched test piece having a thickness of ⅛ inch (3.175 mm).

(5) Measurement of Sulfur Concentration Ratio S/C

The sulfur concentration ratio S/C was determined in accordance with the following procedure using energy dispersive X-ray spectroscopy (EDX). A test piece for observation was prepared from the fiber-reinforced resin composition by a FIB micro-sampling method using a focused ion beam (FIB) apparatus. Next, the number of carbon atoms and the number of sulfur atoms in a predetermined range were detected with apparatus and measurement conditions as described below, and the obtained number of sulfur atoms was divided by the number of carbon fiber atoms to determine a sulfur concentration ratio S/C in this range.

The average of values obtained by making a measurement at 100 spots in any area of 300 nm×300 nm within a region (T1) was defined as S1.

The average of values obtained by making a measurement at 100 spots in any area of 300 nm×300 nm within a region (T2) was defined as S2.

Apparatus: Atomic resolution analytical electron microscope (STEM); JEM-ARM200F (manufactured by JEOL Ltd.)

Energy dispersive X-ray spectrometer; JED-2300 (manufactured by JEOL Ltd.)

Measurement conditions: Accelerated voltage; 200 kV beam spot size; 0.2 nmφ

(6) Abundance Ratio Rb of Carbodiimide Compound (B) in Fiber-Reinforced Composite Material Produced Using Fiber-Reinforced Resin Composition The ratio of C (carbon atoms)/S (sulfur atoms) was determined for each of the regions of R (≤500 nm) and R (>500 nm) using energy dispersive X-ray spectroscopy (EDX). For determination of the ratio C/S, a test piece for observation was prepared from the fiber-reinforced composite material by a FIB micro-sampling method using a focused ion beam (FIB) apparatus. Next, the number of carbon atoms and the number of sulfur atoms in a predetermined range were detected with apparatuses and conditions as described below, and the obtained number of carbon atoms was divided by the number of sulfur atoms to determine a carbon concentration ratio C/S in this range. In this method, whether the ratio of C (carbon atoms) is higher or lower as compared to the ratio C/S in the PAS can be determined at the measurement site, whether the amount of a compound other than the PAS, i.e., the carbodiimide compound (B) is large or small can be determined so that the abundance of the carbodiimide compound (B) at the measurement site can be indirectly known. Each C/S was substituted into formula (1) to determine the abundance ratio Rb of the carbodiimide compound (B) in the fiber-reinforced composite material.

R(≤500 nm)=C(≤500)/S(≤500): abundance of carbodiimide compound (B) within a distance of 500 nm from circumference of carbon fiber (C); and R(>500 nm)=C(>500)/S(>500): abundance of carbodiimide compound (B) outside a distance of 500 nm from circumference of carbon fiber (C).

$$Rb=R(\leq 500\ nm)/R(>500\ nm) \quad (1)$$

Apparatus: Atomic resolution analytical electron microscope (STEM); JEM-ARM200F (manufactured by JEOL Ltd.)

Energy dispersive X-ray spectrometer; JED-2300 (manufactured by JEOL Ltd.)

Measurement conditions: Accelerated voltage; 200 kV beam spot size; 0.2 nmφ

(7) Number Average Fiber Length of Reinforcing Fibers (C') Contained in Fiber-Reinforced Composite Material A part of the fiber-reinforced composite material was cut out and heating-pressed at any of a temperature higher by 30° C. than the melting point, a temperature higher by 150° C. than the softening temperature and a temperature higher by 150° C. than the glass transition temperature of the thermoplastic resin (A') (310° C. when the thermoplastic resin (A') is a polyphenylene sulfide and 300° C. when the thermoplastic resin (A') is a polycarbonate) to obtain a 30 μm-thick film. The obtained film was observed with an optical microscope at a magnification of 150, and reinforcing fibers dispersed in the film were observed. The lengths of the fibers were measured to a unit of 1 μm, and the number average fiber length (Ln) was determined from the following equation.

$$\text{Number average fiber length }(Ln)=(\Sigma Li)/N\text{total}$$

Li: measured fiber length (i=1, 2, 3, . . . , n).

Ntotal: total number of fibers subjected to measurement of fiber length.

(8) Abundance Ratio Rb' of Adhesive Compound (B') in Fiber-Reinforced Composite Material When the thermoplastic resin (A') was a polyphenylene sulfide, the abundance ratio Rb' was measured in the same manner as in the above-mentioned method of measurement of the abundance ratio Rb except that the carbodiimide compound (B) was replaced by the adhesive compound (B'), the carbon fibers (C) were replaced by the carbon fibers (C'), R (≤500 nm) was replaced by R' (≤500 nm), and R (>500 nm) was replaced by R' (>500 nm).

When the thermoplastic resin (A') was a polycarbonate, the abundance ratio Rb' was measured by performing evaluation in the same manner as described above except that O (oxygen atoms) was targeted in place of S (sulfur atoms).

Materials used in examples and comparative examples will now be described.

PASs (A) used in Examples 1 to 10 and Comparative Examples 1 to 19 are as follows.

(PPS-1) Polyphenylene sulfide (melting point: 285° C.; mass average molecular weight: 30,000; acid end product; chloroform extraction amount: 0.5% by mass)

(PPS-2) Polyphenylene sulfide (melting point: 285° C.; mass average molecular weight: 45,000; acid end product; chloroform extraction amount: 0.5% by mass)

(PPS-3) Polyphenylene sulfide (melting point: 285° C.; mass average molecular weight: 55,000; acid end product; chloroform extraction amount: 0.5% by mass)

(PPS-4) Polyphenylene sulfide (melting point: 285° C.; mass average molecular weight: 45,000; acid end product; chloroform extraction amount: 3.0% by mass)

Carbodiimide compounds (B) used in Examples 1 to 10 and Comparative Examples 1 to 19 are as follows.

(CDI-1) Aliphatic polycarbodiimide ""CARBODILITE (registered trademark)" HMV-8CA (manufactured by Nisshinbo Chemical Inc.)" (carbodiimide group equivalent: 278; mass average molecular weight: 3,000)

(CDI-2) Aromatic polycarbodiimide ""STABAXOL (registered trademark)" P (manufactured by Rhein Chemie Ltd.)" (mass average molecular weight: 4,000)

(CDI-3) Aromatic polycarbodiimide ""STABAXOL (registered trademark)" P400 (manufactured by Rhein Chemie Ltd.)" (mass average molecular weight: 20,000)

Carbon fibers (C) used in Examples 1 to 10 and Comparative Examples 1 to 19 are as follows.

(CF-1) A copolymer mainly including polyacrylonitrile was subjected to spinning, a firing treatment and a surface oxidation treatment to obtain a continuous carbon fiber strand with a total monofilament number of 12,000. The characteristics of the carbon fiber were as shown below.

Tensile strength: 4,900 MPa

Tensile elastic modulus: 240 GPa

Tensile elongation: 2%

Specific gravity: 1.8
Diameter of monofilament: 7 μm
Surface oxygen concentration ratio [O/C]: 0.12

(CF-2) A copolymer mainly including polyacrylonitrile was subjected to spinning, a firing treatment and a surface oxidation treatment to obtain a continuous carbon fiber strand with a total monofilament number of 12,000. The characteristics of the carbon fiber were as shown below.
Tensile strength: 4,900 MPa
Tensile elastic modulus: 230 GPa
Tensile elongation: 2%
Specific gravity: 1.8
Diameter of monofilament: 7 μm
Surface oxygen concentration ratio [O/C]: 0.06

Glass fibers used in Comparative Examples 7 or 12 are as follows.

(GF-1) Continuous glass fiber strand made of E-Glass and having a total monofilament number of 1,600
The characteristics of the glass fiber were as shown below.
Tensile strength: 3,400 MPa
Tensile elastic modulus: 72 GPa
Tensile elongation: 3%
Specific gravity: 2.6
Diameter of monofilament: 13 μm Sizing agents (D) used in Examples 1 to 10 and Comparative Examples 1 to 19 are as follows.

(SZ-1) Glycerol triglycidyl ether (manufactured by Wako Pure Chemical Industries, Ltd.)
Mass average molecular weight: 260
Number of epoxy groups per molecule: 3
Value obtained by dividing the mass average molecular weight by the total number of carboxyl groups, amino groups, hydroxyl groups, epoxy groups and hydroxyl groups per molecule: 87

(SZ-2) Bisphenol A diglycidyl ether (manufactured by SIGMA-ALDRICH Corporation)
Mass average molecular weight: 340
Number of epoxy groups per molecule: 2
Value obtained by dividing the mass average molecular weight by the total number of carboxyl groups, amino groups, hydroxyl groups, epoxy groups and hydroxyl groups per molecule: 170

(SZ-3) (3-glycidyloxypropyl)triethoxysilane (manufactured by SIGMA-ALDRICH Corporation)
Mass average molecular weight: 278
Number of epoxy groups per molecule: 1
Value obtained by dividing the mass average molecular weight by the total number of carboxyl groups, amino groups, hydroxyl groups, epoxy groups and hydroxyl groups per molecule: 278

(SZ-4) Polyacrylic acid (manufactured by SIGMA-ALDRICH Corporation)
Mass average molecular weight: 2,000
Number of carboxyl groups per molecule: 27
Value obtained by dividing the mass average molecular weight by the total number of carboxyl groups, amino groups, hydroxyl groups, epoxy groups and hydroxyl groups per molecule: 74

(SZ-5) Polyvinyl alcohol (manufactured by Wako Pure Chemical Industries, Ltd.)
Mass average molecular weight: 22,000
Number of hydroxyl groups per molecule: 500
Value obtained by dividing the mass average molecular weight by the total number of carboxyl groups, amino groups, hydroxyl groups, epoxy groups and hydroxyl groups per molecule: 44

(SZ-6) Polyethyleneimine (manufactured by SIGMA-ALDRICH Corporation)
Mass average molecular weight: 2,000
Number of amino groups per molecule: 47
Value obtained by dividing the mass average molecular weight by the total number of carboxyl groups, amino groups, hydroxyl groups, epoxy groups and hydroxyl groups per molecule: 43

Reinforcing fibers (C') used in Examples 11 to 21 and Comparative Examples 20 to 26 are as follows.

(Reinforcing fiber-1) A copolymer mainly including polyacrylonitrile was subjected to spinning, a firing treatment and a surface oxidation treatment to obtain a continuous carbon fiber strand with a total monofilament number of 12,000. The characteristics of the carbon fiber were as shown below.
Tensile strength: 4,900 MPa
Tensile elastic modulus: 240 GPa
Tensile elongation: 2%
Specific gravity: 1.8
Diameter of monofilament: 7 μm
Surface oxygen concentration ratio [O/C]: 0.12

(Reinforcing fiber-2) A copolymer mainly including polyacrylonitrile was subjected to spinning, a firing treatment and a surface oxidation treatment to obtain a continuous carbon fiber strand with a total monofilament number of 12,000. The characteristics of the carbon fiber were as shown below.
Tensile strength: 4,900 MPa
Tensile elastic modulus: 230 GPa
Tensile elongation: 2%
Specific gravity: 1.8
Diameter of monofilament: 7 μm
Surface oxygen concentration ratio [O/C]: 0.06

(Reinforcing fiber-3) Continuous glass fiber strand made of E-Glass and having a total monofilament number of 1,600
The characteristics of the reinforcing fiber were as shown below.
Tensile strength: 3,400 MPa
Tensile elastic modulus: 72 GPa
Tensile elongation: 3%
Specific gravity: 2.6
Diameter of monofilament: 13 μm Adhesive compounds (B') used in Examples 11 to 21 and Comparative Examples 20 to 26 are as follows.

(Adhesive compound-1) Aliphatic polycarbodiimide ""CARBODILITE (registered trademark)" HMV-8CA (manufactured by Nisshinbo Chemical Inc.)" (carbodiimide group equivalent: 278; mass average molecular weight: 3,000)

(Adhesive compound-2) Aromatic polycarbodiimide ""STABAXOL (registered trademark)" P (manufactured by Rhein Chemie Ltd.)" (mass average molecular weight: 4,000)

(Adhesive compound-3) Aromatic polycarbodiimide ""STABAXOL (registered trademark)" P400 (manufactured by Rhein Chemie Ltd.)" (mass average molecular weight: 20,000)

(Adhesive compound-4) N,N'-dicyclohexylcarbodiimide (manufactured by Wako Pure Chemical Industries, Ltd.) (carbodiimide group equivalent: 206; mass average molecular weight: 206)

Thermoplastic resins (A') used in Examples 11 to 21 and Comparative Examples 20 to 26 are as follows.

(Thermoplastic resin-1) Polyphenylene sulfide (melting point: 285° C.; mass average molecular weight: 30,000; acid end product; chloroform extraction amount: 0.5% by mass)

(Thermoplastic resin-2) Polyphenylene sulfide (melting point: 285° C.; mass average molecular weight: 45,000; acid end product; chloroform extraction amount: 0.5% by mass)

(Thermoplastic resin-3) Polycarbonate "IUPILON (registered trademark)" H-4000 (manufactured by Mitsubishi Engineering-Plastics Corporation) (glass transition temperature: 145° C.; mass average molecular weight: 34,500)

Compounds (E) used as the sizing agent in Examples 11 to 21 and Comparative Examples 20 to 26 are as follows.

(E-1) Glycerol triglycidyl ether (manufactured by Wako Pure Chemical Industries, Ltd.)
Mass average molecular weight: 260
Number of epoxy groups per molecule: 3
Value obtained by dividing the mass average molecular weight by the total number of carboxyl groups, amino groups, hydroxyl groups, epoxy groups and hydroxyl groups per molecule: 87

(E-2) Bisphenol A diglycidyl ether (manufactured by SIGMA-ALDRICH Corporation)
Mass average molecular weight: 340
Number of epoxy groups per molecule: 2
Value obtained by dividing the mass average molecular weight by the total number of carboxyl groups, amino groups, hydroxyl groups, epoxy groups and hydroxyl groups per molecule: 170

(E-3) (3-glycidyloxypropyl)triethoxysilane (manufactured by SIGMA-ALDRICH Corporation)
Mass average molecular weight: 278
Number of epoxy groups per molecule: 1
Value obtained by dividing the mass average molecular weight by the total number of carboxyl groups, amino groups, hydroxyl groups, epoxy groups and hydroxyl groups per molecule: 278

(E-4) A 300 ml separable flask provided with a stirrer, thermometer and a cooling condenser was charged with a mixture of 80 parts by mol of 2,4-toluenediisocyanate (2,4-TDI) and 20 parts by mol of 2,6-toluenediisocyanate (2,6-TDI) (trade name: TDI 80, manufactured by Mitsui Toatsu Chemicals, Inc.), 22.4 g (0.128 mol), 2.20 g of phenyl isocyanate (PhI) (0.0756 mol, 14 parts by mol based on 100 parts by mole of TDI) and 110 ml of dry toluene in a nitrogen atmosphere, and the mixture was homogeneously dissolved while being stirred. Next, 0.0913 g of a 3-methyl-1-phenyl-2-phospholene-1-oxide catalyst (0.000475 mol, 0.37%/TDI) diluted with 1 ml of a solvent identical to a polymerization solvent was added, and the internal temperature was elevated to 110° C. while the mixture was stirred. Generation of carbon dioxide increased as the temperature was elevated, and carbon dioxide was particularly intensely generated when the internal temperature exceeded 80° C. After the internal temperature reached 110° C., polymerization was performed for 3.5 hours. After polymerization was completed, the polymerization product was cooled to room temperature to obtain a transparent carbodiimide copolymer (15% by mass; mass average molecular weight in terms of polystyrene: 3,000). This solution was further diluted to 10% by mass with toluene to obtain a sizing mother liquor containing the compound E-4. (sizing agent identical to the sizing agent described in Example 1 in Japanese Patent Laid-open Publication No. 5-311069)

(E-5) N,N'-dicyclohexylcarbodiimide (manufactured by Wako Pure Chemical Industries, Ltd.) (carbodiimide group equivalent: 206; mass average molecular weight: 206)

Example 1

An injection-molded article including a fiber-reinforced resin composition was prepared in accordance with the following procedure using the PAS (A), carbodiimide compound (B), carbon fibers (C) and sizing agent (D) shown in Table 1.

A fiber bundle of carbon fibers (C) was continuously taken up, immersed in an aqueous sizing mother liquor containing 2% by mass of the sizing agent (D), and then heated and dried at 230° C. to obtain carbon fibers (C) surface-treated with the sizing agent (D). The deposition amount of the sizing agent (D) after drying was 1 part by mass based on 100 parts by mass of the carbon fibers (C). Further, the carbon fibers (C) surface-treated with the sizing agent (D) were cut to a length of 6 mm to prepare chopped strands.

In a twin-screw extruder (TEX-30α from JSW, Inc., L/D=31.5), the PAS (A) and the carbodiimide compound (B) were main-fed, and the chopped strands were side-fed to melt and knead the components. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to form a pellet.

Using an injection molding machine (J150EII-P manufactured by JSW, Inc.), the pellet was injection-molded to prepare test pieces for various kinds of evaluations. The injection molding was performed at a cylinder temperature of 320° C. and a die temperature of 150° C., and the maximum pressure in injection molding was defined as an injection molding pressure.

The obtained test pieces were annealed at 150° C. for 2 hours, then air-cooled, and subjected to tests. Evaluation results were described in Table 1.

Comparative Example 1

Except that the carbodiimide compound (B) was not included, the same procedure as in Example 1 was carried out to prepare test pieces, and the test pieces were subjected to evaluations. Evaluation results were described in Table 1.

Comparative Example 2

Except that the component of the carbodiimide compound (B) was changed from CDI-1 as an aliphatic carbodiimide to CDI-2 as an aromatic carbodiimide compound, the same procedure as in Example 1 was carried out to prepare test pieces, and the test pieces were subjected to evaluations. Evaluation results were described in Table 1.

Comparative Example 3

Except that the component of the carbodiimide compound (B) was changed from CDI-1 as an aliphatic carbodiimide to CDI-3 as an aromatic carbodiimide compound, the same procedure as in Example 1 was carried out to prepare test pieces, and the test pieces were subjected to evaluations. Evaluation results were described in Table 1.

TABLE 1

|  |  | Example 1 | Comparative Example 1 | Comparative Example 2 | Comparative Example 3 |
|---|---|---|---|---|---|
| (Molding material) | | | | | |
| Polyarylene sulfide (A) | Type | PPS-1 | PPS-1 | PPS-1 | PPS-1 |
|  | parts by mass | 100 | 100 | 100 | 100 |
| Carbodiimide compound (B) | Type | CDI-1 | — | CDI-2 | CDI-3 |
|  | parts by mass | 5 | 0 | 5 | 5 |
| Carbon fibers (C) | Type | CF-1 | CF-1 | CF-1 | CF-1 |
|  | parts by mass | 25 | 25 | 25 | 25 |
| Sizing agent (D) | Type | SZ-1 | SZ-1 | SZ-1 | SZ-1 |
|  | parts by mass | 0.25 | 0.25 | 0.25 | 0.25 |
| (Moldability) | | | | | |
| Injection molding pressure | MPa | 60 | 50 | 50 | 50 |
| (Molded article characteristics) | | | | | |
| Number average fiber length | mm | 0.1 | 0.1 | 0.1 | 0.1 |
| Mass average fiber length | mm | 0.2 | 0.2 | 0.2 | 0.2 |
| Density | g/cm$^3$ | 1.40 | 1.42 | 1.40 | 1.40 |
| Tensile elastic modulus | GPa | 20 | 21 | 19 | 19 |
| Tensile strength | MPa | 250 | 195 | 195 | 195 |
| Tensile elongation | % | 1.8 | 1.2 | 1.2 | 1.2 |
| Notched Charpy impact strength | kJ/m$^2$ | 9 | 6 | 6 | 6 |
| Sulfur element concentration gradient ΔS | % | 35 | 3 | 3 | 3 |
| Sulfur concentration ratio S/C in region (T2) | — | 0.13 | 0.15 | 0.13 | 0.13 |
| Abundance ratio Rb of carbodiimide compound (B) | — | 1.6 | 1 | 1 | 1 |

The results in examples and comparative examples in Table 1 show the following.

It is apparent that in the molded article including the fiber-reinforced resin composition described in Example 1, an aliphatic carbodiimide compound is used as the carbodiimide compound (B) and therefore the tensile strength and the tensile elongation are considerably improved as compared to the molded article including the fiber-reinforced resin composition described in Comparative Example 1 which does not include the carbodiimide compound (B), and the molded articles including the fiber-reinforced resin compositions described in Comparative Examples 2 and 3 in which an aromatic carbodiimide compound is used as the carbodiimide compound (B).

Example 2

Except that the carbon fibers (C) were changed from CF-1 to CF-2, the same procedure as in Example 1 was carried out to prepare test pieces, and the test pieces were subjected to evaluations. Evaluation results were described in Table 2.

Comparative Example 4

Except that the sizing agent (D) was changed from SZ-1 to SZ-2, the same procedure as in Example 2 was carried out to prepare test pieces, and the test pieces were subjected to evaluations. Evaluation results were described in Table 2.

Comparative Example 5

Except that the sizing agent (D) was not included, the same procedure as in Example 2 was carried out to prepare test pieces, and the test pieces were subjected to evaluations. Evaluation results were described in Table 2.

Comparative Example 6

Except that the sizing agent (D) was changed from SZ-1 to SZ-3, the same procedure as in Example 2 was carried out to prepare test pieces, and the test pieces were subjected to evaluations. Evaluation results were described in Table 2.

Comparative Example 7

Except that CF-1 as glass fibers was used in place of CF-2 as carbon fibers (C), and the sizing agent (D) was changed from SZ-1 to SZ-3, the same procedure as in Example 2 was carried out to prepare test pieces, and the test pieces were subjected to evaluations. Evaluation results were described in Table 2.

Comparative Example 8

Except that the carbodiimide compound (B) was not included, the same procedure as in Example 2 was carried out to prepare test pieces, and the test pieces were subjected to evaluations. Evaluation results were described in Table 2.

Comparative Example 9

Except that the carbodiimide compound (B) was not included, the same procedure as in Comparative Example 4 was carried out to prepare test pieces, and the test pieces were subjected to evaluations. Evaluation results were described in Table 2.

Comparative Example 10

Except that the carbodiimide compound (B) was not included, the same procedure as in Comparative Example 5 was carried out to prepare test pieces, and the test pieces were subjected to evaluations. Evaluation results were described in Table 2.

Comparative Example 11

Except that the carbodiimide compound (B) was not included, the same procedure as in Comparative Example 6 was carried out to prepare test pieces, and the test pieces were subjected to evaluations. Evaluation results were described in Table 2.

Comparative Example 12

Except that the carbodiimide compound (B) was not included, the same procedure as in Comparative Example 7 was carried out to prepare test pieces, and the test pieces were subjected to evaluations. Evaluation results were described in Table 2.

Example 3

Except that the sizing agent (D) was changed from SZ-1 to SZ-4, the same procedure as in Example 2 was carried out to prepare test pieces, and the test pieces were subjected to evaluations. Evaluation results were described in Table 2.

Example 4

Except that the sizing agent (D) was changed from SZ-1 to SZ-5, the same procedure as in Example 2 was carried out to prepare test pieces, and the test pieces were subjected to evaluations. Evaluation results were described in Table 2.

Example 5

Except that the sizing agent (D) was changed from SZ-1 to SZ-6, the same procedure as in Example 2 was carried out to prepare test pieces, and the test pieces were subjected to evaluations. Evaluation results were described in Table 2.

TABLE 2

| | | | Example 2 | Comparative Example 4 | Comparative Example 5 | Comparative Example 6 | Comparative Example 7 | Comparative Example 8 | Comparative Example 9 |
|---|---|---|---|---|---|---|---|---|---|
| (Molding material) | | | | | | | | | |
| Polyarylene sulfide (A) | Type | | PPS-1 | PPS-1 | PPS-1 | PPS-1 | PPS-1 | PPS-1 | PPS-1 |
| | parts by mass | | 100 | 100 | 100 | 100 | 100 | 100 | 100 |
| Carbodiimide compound (B) | Type | | CDI-1 | CDI-1 | CDI-1 | CDI-1 | CDI-1 | — | — |
| | parts by mass | | 5 | 5 | 5 | 5 | 5 | 0 | 0 |
| Carbon fibers (C) | Type | | CF-2 | CF-2 | CF-2 | CF-2 | GF-1 | CF-2 | CF-2 |
| | parts by mass | | 25 | 25 | 25 | 25 | 25 | 25 | 25 |
| Sizing agent (D) | Type | | SZ-1 | SZ-2 | — | SZ-3 | SZ-3 | SZ-1 | SZ-2 |
| | parts by mass | | 0.25 | 0.25 | 0 | 0.25 | 0.25 | 0.25 | 0.25 |
| (Moldability) | | | | | | | | | |
| Injection molding pressure | MPa | | 60 | 60 | 60 | 60 | 75 | 50 | 50 |
| (Molded article characteristics) | | | | | | | | | |
| Number average fiber length | mm | | 0.1 | 0.1 | 0.1 | 0.1 | 0.1 | 0.1 | 0.1 |
| Mass average fiber length | mm | | 0.2 | 0.2 | 0.2 | 0.2 | 0.2 | 0.2 | 0.2 |
| Density | g/cm$^3$ | | 1.40 | 1.40 | 1.40 | 1.40 | 1.48 | 1.42 | 1.42 |
| Tensile elastic modulus | GPa | | 20 | 20 | 20 | 20 | 8 | 20 | 20 |
| Tensile strength | MPa | | 240 | 210 | 210 | 210 | 80 | 195 | 185 |
| Tensile elongation | % | | 1.7 | 1.5 | 1.4 | 1.4 | 1.3 | 1.0 | 1.0 |
| Notched Charpy impact strength | kJ/m$^2$ | | 9 | 7 | 7 | 6 | 3 | 5 | 5 |
| Sulfur element concentration gradient ΔS | % | | 35 | 29 | 26 | 26 | 26 | 3 | 3 |
| Sulfur concentration ratio S/C in region (T2) | — | | 0.13 | 0.13 | 0.13 | 0.13 | 0.13 | 0.15 | 0.15 |
| Abundance ratio Rb of carbodiimide compound (B) | — | | 1.6 | 1.4 | 1.3 | 1.3 | 1.3 | 1 | 1 |

| | | | Comparative Example 10 | Comparative Example 11 | Comparative Example 12 | Example 3 | Example 4 | Example 5 |
|---|---|---|---|---|---|---|---|---|
| (Molding material) | | | | | | | | |
| Polyarylene sulfide (A) | Type | | PPS-1 | PPS-1 | PPS-1 | PPS-1 | PPS-1 | PPS-1 |
| | parts by mass | | 100 | 100 | 100 | 100 | 100 | 100 |
| Carbodiimide compound (B) | Type | | — | — | — | CDI-1 | CDI-1 | CDI-1 |
| | parts by mass | | 0 | 0 | 0 | 5 | 5 | 5 |
| Carbon fibers (C) | Type | | CF-2 | CF-2 | GF-1 | CF-2 | CF-2 | CF-2 |
| | parts by mass | | 25 | 25 | 25 | 25 | 25 | 25 |
| Sizing agent (D) | Type | | — | SZ-3 | SZ-3 | SZ-4 | SZ-5 | SZ-6 |
| | parts by mass | | 0 | 0.25 | 0.25 | 0.25 | 0.25 | 0.25 |
| (Moldability) | | | | | | | | |
| Injection molding pressure | MPa | | 50 | 50 | 60 | 60 | 60 | 60 |
| (Molded article characteristics) | | | | | | | | |
| Number average fiber length | mm | | 0.1 | 0.1 | 0.1 | 0.1 | 0.1 | 0.1 |
| Mass average fiber length | mm | | 0.2 | 0.2 | 0.2 | 0.2 | 0.2 | 0.2 |
| Density | g/cm$^3$ | | 1.42 | 1.42 | 1.50 | 1.40 | 1.40 | 1.40 |
| Tensile elastic modulus | GPa | | 20 | 20 | 8 | 20 | 20 | 20 |
| Tensile strength | MPa | | 185 | 185 | 75 | 220 | 220 | 230 |

TABLE 2-continued

|  |  |  |  |  |  |  |  |
|---|---|---|---|---|---|---|---|
| Tensile elongation | % | 1.0 | 1.0 | 1.1 | 1.6 | 1.5 | 1.6 |
| Notched Charpy impact strength | kJ/m$^2$ | 5 | 5 | 3 | 9 | 9 | 9 |
| Sulfur element concentration gradient ΔS | % | 3 | 3 | 3 | 32 | 32 | 35 |
| Sulfur concentration ratio S/C in region (T2) | — | 0.15 | 0.15 | 0.15 | 0.13 | 0.13 | 0.13 |
| Abundance ratio Rb of carbodiimide compound (B) | — | 1 | 1 | 1 | 1.5 | 1.5 | 1.5 |

The results in examples and comparative examples in Table 2 show the following.

It is apparent that in the molded article including the fiber-reinforced resin composition described in Example 2, SZ-1 having three epoxy groups in one molecule is used as the sizing agent (D) and therefore tensile strength and the tensile elongation are considerably improved as compared to the molded article including the fiber-reinforced fiber-reinforced resin composition described in Comparative Example 4 in which SZ-2 having two epoxy groups in one molecule is used as the sizing agent (D), the molded article including the fiber-reinforced fiber-reinforced resin composition described in Comparative Example 5, which does not include the sizing agent (D), and the molded article including the fiber-reinforced fiber-reinforced resin composition described in Comparative Example 6 in which SZ-3 having one epoxy group in one molecule is used as the sizing agent (D).

It is apparent that in the molded article including the fiber-reinforced resin composition described in Example 2, PAN-based carbon fibers are used as the carbon fibers (C) and therefore the tensile strength and the tensile elongation are considerably improved as compared to the molded article including the fiber-reinforced fiber-reinforced resin composition described in Comparative Example 7 in which glass fibers are used in place of the carbon fibers (C).

A comparison between the molded article including the fiber-reinforced resin composition described in Example 2 and the molded articles including the fiber-reinforced resin compositions described in Comparative Examples 4 to 7 and comparison between the molded article including the fiber-reinforced resin composition described in Example 2 and the molded articles including the fiber-reinforced resin compositions described in Comparative Examples 8 to 12 show that when an aliphatic carbodiimide is used as the carbodiimide compound (B), the tensile strength and tensile elongation of a molded article including a fiber-reinforced resin composition are improved, and particularly that when PAN-based carbon fibers are used as the carbon fibers (C), and SZ-1 having three epoxy groups in one molecule is used as the sizing agent (D), a high effect of improving the tensile strength and the tensile elongation is obtained.

A comparison between the molded articles including the fiber-reinforced resin compositions described in Examples 2 to 5 and the molded articles including the fiber-reinforced resin compositions described in Comparative Examples 4 to 6 shows that when a compound having, in one molecule, three or more functional groups of at least one type selected from a carboxyl group, an amino group, a hydroxyl group and an epoxy group is used as the sizing agent (D), the tensile strength and tensile elongation of the resulting molded article including a fiber-reinforced resin composition are considerably improved.

Example 6

Except that the PAS (A) is changed from PPS-1 to PPS-2, the same procedure as in Example 1 was carried out to prepare test pieces, and the test pieces were subjected to evaluations. Evaluation results were described in Table 3.

Example 7

Except that the PAS (A) is changed from PPS-1 to PPS-3, the same procedure as in Example 1 was carried out to prepare test pieces, and the test pieces were subjected to evaluations. Evaluation results were described in Table 3.

Comparative Example 13

Except that the carbodiimide compound (B) was not included, the same procedure as in Example 6 was carried out to prepare test pieces, and the test pieces were subjected to evaluations. Evaluation results were described in Table 3.

Comparative Example 14

Except that the carbodiimide compound (B) was not included, the same procedure as in Example 7 was carried out to prepare test pieces, and the test pieces were subjected to evaluations. Evaluation results were described in Table 3.

Example 8

Except that the PAS (A) is changed from PPS-1 to PPS-4, the same procedure as in Example 1 was carried out to prepare test pieces, and the test pieces were subjected to evaluations. Evaluation results were described in Table 3.

TABLE 3

|  |  | Example 6 | Example 7 | Comparative Example 13 | Comparative Example 14 | Example 8 |
|---|---|---|---|---|---|---|
| (Molding material) |  |  |  |  |  |  |
| Polyarylene sulfide (A) | Type | PPS-2 | PPS-3 | PPS-2 | PPS-3 | PPS-4 |
|  | parts by mass | 100 | 100 | 100 | 100 | 100 |

TABLE 3-continued

| | | Example 6 | Example 7 | Comparative Example 13 | Comparative Example 14 | Example 8 |
|---|---|---|---|---|---|---|
| Carbodiimide compound (B) | Type | CDI-1 | CDI-1 | — | — | CDI-1 |
| | parts by mass | 5 | 5 | 0 | 0 | 5 |
| Carbon fibers (C) | Type | CF-1 | CF-1 | CF-1 | CF-1 | CF-1 |
| | parts by mass | 25 | 25 | 25 | 25 | 25 |
| Sizing agent (D) | Type | SZ-1 | SZ-1 | SZ-1 | SZ-1 | SZ-1 |
| | parts by mass | 0.25 | 0.25 | 0.25 | 0.25 | 0.25 |
| (Moldability) | | | | | | |
| Injection molding pressure | MPa | 90 | 110 | 70 | 90 | 55 |
| (Molded article characteristics) | | | | | | |
| Number average fiber length | mm | 0.1 | 0.1 | 0.1 | 0.1 | 0.1 |
| Mass average fiber length | mm | 0.2 | 0.2 | 0.2 | 0.2 | 0.2 |
| Density | g/cm$^3$ | 1.40 | 1.40 | 1.42 | 1.42 | 1.40 |
| Tensile elastic modulus | GPa | 19 | 19 | 21 | 20 | 20 |
| Tensile strength | MPa | 225 | 220 | 205 | 210 | 215 |
| Tensile elongation | % | 2.1 | 2.0 | 1.4 | 1.5 | 1.7 |
| Notched Charpy impact strength | kJ/m$^2$ | 10 | 10 | 6 | 6 | 5 |
| Sulfur element concentration gradient ΔS | % | 35 | 35 | 3 | 3 | 35 |
| Sulfur concentration ratio S/C in region (T2) | — | 0.13 | 0.13 | 0.15 | 0.15 | 0.13 |
| Abundance ratio Rb of carbodiimide compound (B) | — | 1.5 | 1.5 | 1 | 1 | 1.5 |

The results in examples and comparative examples in Table 1 and Table 3 show the following.

A comparison between the molded articles including the fiber-reinforced resin compositions described in Examples 1, 6 and 7 and the molded articles including the fiber-reinforced resin compositions described in Comparative Examples 1, 13 and 14 shows that when an aliphatic carbodiimide is used as the carbodiimide compound (B), the tensile strength and tensile elongation of a molded article including a fiber-reinforced resin composition are improved and particularly that as the mass average molecular weight of the PAS (A) decreases, the effect of improving the tensile strength and the tensile elongation is enhanced and the injection molding pressure decreases so that molding processability is improved.

A comparison between the molded article including the fiber-reinforced resin composition described in Example 6 and the molded article including the fiber-reinforced resin composition described in Example 8 shows that when the chloroform extraction amount of the PAS (A) is 2% by mass or less, the tensile strength and the tensile elongation are improved.

Example 9

Except that the ratio of the carbon fibers (C) was changed so that the content of the carbon fibers (C) was 15 parts by mass based on 100 parts by mass of the PAS (A) while the deposition amount of the sizing agent (D) was 1 part by mass based on 100 parts by mass of the carbon fibers (C), the same procedure as in Example 1 was carried out to prepare test pieces, and the test pieces were subjected to evaluations. Evaluation results were described in Table 4.

Example 10

Except that the ratio of the carbon fibers (C) was changed so that the content of the carbon fibers (C) was 45 parts by mass based on 100 parts by mass of the PAS (A) while the deposition amount of the sizing agent (D) was 1 part by mass based on 100 parts by mass of the carbon fibers (C), the same procedure as in Example 1 was carried out to prepare test pieces, and the test pieces were subjected to evaluations. Evaluation results were described in Table 4.

Comparative Example 15

Except that the carbodiimide compound (B) was not included, the same procedure as in Example 9 was carried out to prepare test pieces, and the test pieces were subjected to evaluations. Evaluation results were described in Table 4.

Comparative Example 16

Except that the carbodiimide compound (B) was not included, the same procedure as in Example 10 was carried out to prepare test pieces, and the test pieces were subjected to evaluations. Evaluation results were described in Table 4.

Comparative Example 17

An attempt was made to prepare test pieces by carrying out the same procedure as in Example 1 except that the ratio of the carbon fibers (C) was changed so that the content of the carbon fibers (C) was 400 parts by mass based on 100 parts by mass of the PAS (A) while the deposition amount of the sizing agent (D) was 1 part by mass based on 100 parts by mass of the carbon fibers (C), but clogging occurred in a cylinder of a twin-screw extruder, and thus a fiber-reinforced resin composition was not obtained. The composition ratio was described in Table 4.

Comparative Example 18

An attempt was made to prepare test pieces by carrying out the same procedure as in Example 1 except that the ratio of the carbodiimide compound (B) was changed so that the content of the carbodiimide compound (B) was 20 parts by mass based on 100 parts by mass of the PAS (A), but it was unable to perform molding due to metering defects in an injection molding machine. The composition ratio was described in Table 4.

Comparative Example 19

Except that in the step of preparing carbon fibers (C) surface-treated with the sizing agent (D), the concentration of the aqueous sizing mother liquor containing the sizing agent (D) was 40% by mass, and the deposition amount of the sizing agent (D) after drying was 20 parts by mass based on 100 parts by mass of the carbon fibers (C), the same procedure as in Example 4 was carried out to prepare test pieces, and the test pieces were subjected to evaluations. Evaluation results were described in Table 4.

and the molded article including the fiber-reinforced resin composition described in Comparative Example 19 shows that when the content of the sizing agent (D) exceeds our range, the tensile strength and tensile elongation of the molded article including the fiber-reinforced resin composition are reduced.

Example 11

A fiber-reinforced composite material was prepared in accordance with the following procedure using the reinforcing fibers (C'), adhesive compound (B') and thermoplastic resin (A') shown in Table 5.

A fiber bundle of reinforcing fibers (C') was continuously taken up, immersed in an aqueous sizing mother liquor

TABLE 4

|  |  | Example 9 | Example 10 | Comparative Example 15 | Comparative Example 16 | Comparative Example 17 | Comparative Example 18 | Comparative Example 19 |
|---|---|---|---|---|---|---|---|---|
| (Molding material) |  |  |  |  |  |  |  |  |
| Polyarylene sulfide (A) | Type | PPS-1 | PPS-1 | PPS-1 | PPS-1 | PPS-1 | PPS-1 | PPS-1 |
|  | parts by mass | 100 | 100 | 100 | 100 | 100 | 100 | 100 |
| Carbodiimide compound (B) | Type | CDI-1 | CDI-1 | — | — | CDI-1 | CDI-1 | CDI-1 |
|  | parts by mass | 5 | 5 | 0 | 0 | 5 | 20 | 5 |
| Carbon fibers (C) | Type | CF-1 | CF-1 | CF-1 | CF-1 | CF-1 | CF-1 | CF-2 |
|  | parts by mass | 15 | 45 | 15 | 45 | 400 | 25 | 25 |
| Sizing agent (D) | Type | SZ-1 | SZ-1 | SZ-1 | SZ-1 | SZ-1 | SZ-1 | SZ-5 |
|  | parts by mass | 0.15 | 0.45 | 0.15 | 0.45 | 4.00 | 0.25 | 5 |
| (Moldability) |  |  |  |  |  |  |  |  |
| Injection molding pressure | MPa | 40 | 125 | 35 | 110 | — | — | 70 |
| (Molded article characteristics) |  |  |  |  |  |  |  |  |
| Number average fiber length | mm | 0.1 | 0.1 | 0.1 | 0.1 | — | — | 0.1 |
| Mass average fiber length | mm | 0.2 | 0.2 | 0.2 | 0.2 | — | — | 0.2 |
| Density | g/cm$^3$ | 1.36 | 1.44 | 1.38 | 1.46 | — | — | 1.40 |
| Tensile elastic modulus | GPa | 10 | 31 | 11 | 32 | — | — | 19 |
| Tensile strength | MPa | 150 | 255 | 110 | 230 | — | — | 200 |
| Tensile elongation | % | 1.8 | 1.6 | 1.1 | 1.0 | — | — | 1.1 |
| Notched Charpy impact strength | kJ/m$^2$ | 5 | 10 | 3 | 9 | — | — | 6 |
| Sulfur element concentration gradient ΔS | % | 35 | 35 | 3 | 3 | — | — | 100 |
| Sulfur concentration ratio S/C in region (T2) | — | 0.13 | 0.13 | 0.15 | 0.15 | — | — | 0 |
| Abundance ratio Rb of carbodiimide— compound (B) |  | 1.6 | 1.6 | 1 | 1 | — | — | 1 |

The results in examples and comparative examples in Table 1, Table 2 and Table 4 show the following.

A comparison between the molded articles including the fiber-reinforced resin compositions described in Examples 1, 9 and 10 and the molded articles including the fiber-reinforced resin compositions described in Comparative Examples 1, 15 and 16 shows that even when the content of the carbon fibers (C) in the fiber-reinforced resin composition is changed, the tensile strength and tensile elongation of the molded article including the fiber-reinforced resin composition are improved.

From Comparative Example 17, it is apparent that when the content of the carbon fibers (C) exceeds our range, productivity of the fiber-reinforced resin composition is markedly deteriorated.

From Comparative Example 18, it is apparent that when the content of the carbodiimide compound (B) exceeds our range, molding processability of the fiber-reinforced resin composition is markedly deteriorated.

A comparison between the molded article including the fiber-reinforced resin composition described in Example 4 containing 2% by mass of a sizing agent (E-1), and then heated and dried at 230° C. to obtain reinforcing fibers (C') surface-treated with the sizing agent (E-1). The deposition amount of the sizing agent (E-1) after drying was 1 part by mass based on 100 parts by mass of the reinforcing fibers (C'). Further, the reinforcing fibers (C') surface-treated with the sizing agent (E-1) were cut to a length of 6 mm to prepare chopped strands.

In a twin-screw extruder (TEX-30α from JSW, Inc., L/D=31.5), the adhesive compound (B') and the thermoplastic resin (A') were main-fed, and the chopped strands were side-fed to melt and knead the components. The extruder was side-fed at 40% of a distance between the position at which the extruder was main-fed and the discharge port of the extruder. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to form a pellet.

Using an injection molding machine (J150EII-P manufactured by JSW, Inc.), the pellet was injection-molded to prepare test pieces for various kinds of evaluations. The injection molding was performed at a cylinder temperature of 320° C. and a die temperature of 150° C.

The obtained test pieces were annealed at 150° C. for 2 hours, then air-cooled, and subjected to tests to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are shown in Table 5.

Example 12

A fiber-reinforced composite material was prepared in accordance with the following procedure using the reinforcing fibers (C'), adhesive compound (B') and thermoplastic resin (A') shown in Table 5.

The reinforcing fibers (C') were cut to a length of 6 mm to prepare chopped strands.

In a twin-screw extruder (TEX-30α from JSW, Inc., L/D=31.5), the adhesive compound (B') and the thermoplastic resin (A') were main-fed and the chopped strands were side-fed to melt and knead the components. The extruder was side-fed at 40% of a distance between the position at which the extruder was main-fed and the discharge port of the extruder. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to form a pellet.

Using an injection molding machine (J150EII-P manufactured by JSW, Inc.), the pellet was injection-molded to prepare test pieces for various kinds of evaluations. The injection molding was performed at a cylinder temperature of 320° C. and a die temperature of 150° C.

The obtained test pieces were annealed at 150° C. for 2 hours, then air-cooled and subjected to tests to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are shown in Table 5.

Examples 13 to 21

Except that the reinforcing fibers (C'), the adhesive compound (B') and the thermoplastic resin (A') were changed as shown in Table 5, the same procedure as in Example 11 was carried out to prepare test pieces for various kinds of evaluations. The obtained test pieces were used to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are collectively shown in Table 5.

Comparative Example 20

A fiber-reinforced composite material was prepared in accordance with the following procedure using the reinforcing fibers (C') and thermoplastic resin (A') shown in Table 6.

A fiber bundle of reinforcing fibers (C') was continuously taken up, immersed in an aqueous sizing mother liquor containing 2% by mass of a sizing agent (E-5), and then heated and dried at 230° C. to obtain reinforcing fibers (C') surface-treated with the sizing agent (E-5). The deposition amount of the sizing agent (E-5) after drying was 1 part by mass based on 100 parts by mass of the reinforcing fibers (C'). Further, the reinforcing fibers (C') surface-treated with the sizing agent (E-5) were cut to a length of 6 mm to prepare chopped strands.

In a twin-screw extruder (TEX-30α from JSW, Inc., L/D=31.5), the thermoplastic resin (A') was main-fed, and the chopped strands were side-fed to melt and knead the components. The extruder was side-fed at 40% of a distance between the position at which the extruder was main-fed and the discharge port of the extruder. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to form a pellet.

Using an injection molding machine (J150EII-P manufactured by JSW, Inc.), the pellet was injection-molded to prepare test pieces for various kinds of evaluations. The injection molding was performed at a cylinder temperature of 320° C. and a die temperature of 150° C.

The obtained test pieces were annealed at 150° C. for 2 hours, then air-cooled and subjected to tests to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are shown in Table 6.

Comparative Example 21

Except that the reinforcing fibers (C'), the adhesive compound (B') and the thermoplastic resin (A') were changed as shown in Table 6, the same procedure as in Example 11 was carried out to prepare test pieces for various kinds of evaluations. The obtained test pieces were used to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The obtained results are shown in Table 6.

Comparative Example 22

A fiber-reinforced composite material was prepared in accordance with the following procedure using the reinforcing fibers (C') and thermoplastic resin (A') shown in Table 6.

A fiber bundle of reinforcing fibers (C') was continuously taken up, immersed in a toluene sizing mother liquor containing 10% by mass of a sizing agent (E-4), and then heated and dried at 260° C. to obtain reinforcing fibers (C') surface-treated with the sizing agent (E-4). The deposition amount of the sizing agent (E-4) after drying was 3.1 parts by mass based on 100 parts by mass of the reinforcing fibers (C'). Further, the reinforcing fibers (C') surface-treated with the sizing agent (E-4) were cut to a length of 6 mm to prepare chopped strands.

In a twin-screw extruder (TEX-30α from JSW, Inc., L/D=31.5), the thermoplastic resin (A') was main-fed, and the chopped strands were side-fed to melt and knead the components. The extruder was side-fed at 40% of a distance between the position at which the extruder was main-fed and the discharge port of the extruder. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to form a pellet.

Using an injection molding machine (J150EII-P manufactured by JSW, Inc.), the pellet was injection-molded to prepare test pieces for various kinds of evaluations. The injection molding was performed at a cylinder temperature of 320° C. and a die temperature of 150° C.

The obtained test pieces were annealed at 150° C. for 2 hours, then air-cooled, and subjected to tests to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are shown in Table 6.

Comparative Example 23

A fiber-reinforced composite material was prepared in accordance with the following procedure using the reinforcing fibers (C'), adhesive compound (B') and thermoplastic resin (A') shown in Table 6.

A fiber bundle of reinforcing fibers (C') was continuously taken up, immersed in an aqueous sizing mother liquor containing 2% by mass of a sizing agent (E-1), and then heated and dried at 230° C. to obtain reinforcing fibers (C') surface-treated with the sizing agent (E-1). The deposition amount of the sizing agent (E-1) after drying was 1 part by mass based on 100 parts by mass of the reinforcing fibers (C'). Further, the reinforcing fibers (C') surface-treated with the sizing agent (E-1) were cut to a length of 6 mm to prepare chopped strands.

The adhesive compound (B') and thermoplastic resin (A') shown in Table 6 were mixed by a Henschel mixer for 5 minutes, the mixture was added in a twin-screw extruder with a cylinder temperature of 320° C., the chopped strands were separately added through a side-feeding section of the extruder, and the mixture was melted and kneaded with the screw rotation number and discharge amount adjusted so that the resin temperature was 350° C. at a discharge port in the twin-screw extruder, thereby obtaining a pellet. The extruder was side-fed at 40% of a distance between the position at which the extruder was main-fed and the discharge port of the extruder.

Using an injection molding machine (J150EII-P manufactured by JSW, Inc.), the pellet was injection-molded to prepare test pieces for various kinds of evaluations. The injection molding was performed at a cylinder temperature of 320° C. and a die temperature of 150° C.

The obtained test pieces were annealed at 150° C. for 2 hours, then air-cooled, and subjected to tests to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are shown in Table 6.

Comparative Example 24

Except that the reinforcing fibers (C'), the adhesive compound (B') and the thermoplastic resin (A') were changed as shown in Table 6, the same procedure as in Comparative Example 23 was carried out to prepare test pieces for various kinds of evaluations. The obtained test pieces were used to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are collectively shown in Table 6.

Comparative Example 25

Except that in melting and kneading in the twin-screw extruder, the thermoplastic resin (A') is main-fed, and chopped strands including the reinforcing fibers (C') and the adhesive compound (B') are side-fed instead of main-feeding the adhesive compound (B') and the thermoplastic resin (A') and side-feeding chopped strands including the reinforcing fibers (C'), the same procedure as in Example 12 was carried out to prepare test pieces for various kinds of evaluations. The obtained test pieces were used to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are collectively shown in Table 6.

Comparative Example 26

Except that in melting and kneading in the twin-screw extruder, the thermoplastic resin (A') and chopped strands including the reinforcing fibers (C') are main-fed, and the adhesive compound (B') is side-fed instead of main-feeding the adhesive compound (B') and the thermoplastic resin (A') and side-feeding chopped strands including the reinforcing fibers (C'), the same procedure as in Example 12 was carried out to prepare test pieces for various kinds of evaluations. The obtained test pieces were used to measure the number average fiber length of the reinforcing fibers (C') contained in the fiber-reinforced composite material, the abundance ratio Rb' of the adhesive compound (B') in the fiber-reinforced composite material, and the tensile strength of the fiber-reinforced composite material by a tension test. The results are collectively shown in Table 6.

TABLE 5

| | Reinforcing fibers (C') | | | | Adhesive compound (B') | | | Thermoplastic resin (A') | | | Fiber-reinforced composite material characteristics | |
|---|---|---|---|---|---|---|---|---|---|---|---|---|
| Examples | Type | parts by mass | Sizing agent | Number average fiber length (mm) | Type | parts by mass | Mass average molecular weight | Type | parts by mass | Mass average molecular weight | Abundance ratio Rb' of adhesive compound | Tensile strength (MPa) |
| 11 | Reinforcing fiber-1 | 25 | E-1 | 0.05 | Adhesive compound-1 | 5 | 3,000 | Thermoplastic resin-1 | 100 | 30,000 | 1.6 | 200 |
| 12 | Reinforcing fiber-1 | 25 | — | 0.1 | Adhesive compound-1 | 5 | 3,000 | Thermoplastic resin-1 | 100 | 30,000 | 1.6 | 175 |

TABLE 5-continued

| | Reinforcing fibers (C') | | | | Adhesive compound (B') | | | Thermoplastic resin (A') | | | Fiber-reinforced composite material characteristics | |
|---|---|---|---|---|---|---|---|---|---|---|---|---|
| Examples | Type | parts by mass | Sizing agent | Number average fiber length (mm) | Type | parts by mass | Mass average molecular weight | Type | parts by mass | Mass average molecular weight | Abundance ratio Rb' of adhesive compound | Tensile strength (MPa) |
| 13 | Reinforcing fiber-1 | 25 | E-1 | 0.1 | Adhesive compound-1 | 5 | 3,000 | Thermoplastic resin-1 | 100 | 30,000 | 1.6 | 250 |
| 14 | Reinforcing fiber-2 | 25 | E-1 | 0.1 | Adhesive compound-1 | 5 | 3,000 | Thermoplastic resin-1 | 100 | 30,000 | 1.5 | 240 |
| 15 | Reinforcing fiber-1 | 25 | E-2 | 0.1 | Adhesive compound-1 | 5 | 3,000 | Thermoplastic resin-1 | 100 | 30,000 | 1.3 | 210 |
| 16 | Reinforcing fiber-1 | 25 | E-4 | 0.1 | Adhesive compound-1 | 5 | 3,000 | Thermoplastic resin-1 | 100 | 30,000 | 1.2 | 220 |
| 17 | Reinforcing fiber-1 | 25 | E-1 | 0.1 | Adhesive compound-2 | 5 | 4,000 | Thermoplastic resin-1 | 100 | 30,000 | 1.2 | 195 |
| 18 | Reinforcing fiber-1 | 25 | E-1 | 0.1 | Adhesive compound-3 | 5 | 20,000 | Thermoplastic resin-1 | 100 | 30,000 | 1.2 | 185 |
| 19 | Reinforcing fiber-1 | 25 | E-1 | 0.1 | Adhesive compound-1 | 5 | 3,000 | Thermoplastic resin-2 | 100 | 45,000 | 1.3 | 225 |
| 20 | Reinforcing fiber-1 | 25 | E-1 | 0.1 | Adhesive compound-1 | 5 | 3,000 | Thermoplastic resin-3 | 100 | 34,500 | 1.2 | 190 |
| 21 | Reinforcing fiber-3 | 25 | E-3 | 0.1 | Adhesive compound-1 | 5 | 3,000 | Thermoplastic resin-1 | 100 | 30,000 | 1.2 | 80 |

TABLE 6

| | Reinforcing fibers (C') | | | | Adhesive compound (B') | | | Thermoplastic resin (A') | | | Fiber-reinforced composite material characteristics | |
|---|---|---|---|---|---|---|---|---|---|---|---|---|
| Comparative Example | Type | parts by mass | Sizing agent | Number average fiber length (mm) | Type | parts by mass | Mass average molecular weight | Type | parts by mass | Mass average molecular weight | Abundance ratio Rb' of adhesive compound | Tensile strength (MPa) |
| 20 | Reinforcing fiber-1 | 25 | E-5 | 0.1 | — | — | — | Thermoplastic resin-1 | 100 | 30,000 | 1.1 | 160 |
| 21 | Reinforcing fiber-1 | 25 | E-1 | 0.1 | Adhesive compound-4 | 5 | 206 | Thermoplastic resin-1 | 100 | 30,000 | 1.2 | 165 |
| 22 | Reinforcing fiber-1 | 25 | E-4 | 3 | — | — | — | Thermoplastic resin-1 | 100 | 30,000 | 1 | 170 |
| 23 | Reinforcing fiber-1 | 25 | E-1 | 0.1 | Adhesive compound-2 | 5 | 4,000 | Thermoplastic resin-1 | 100 | 30,000 | 1 | 145 |
| 24 | Reinforcing fiber-3 | 25 | E-3 | 0.1 | Adhesive compound-1 | 5 | 3,000 | Thermoplastic resin-1 | 100 | 30,000 | 1 | 60 |
| 25 | Reinforcing fiber-1 | 25 | — | 0.1 | Adhesive compound-1 | 5 | 3,000 | Thermoplastic resin-1 | 100 | 30,000 | 1 | 165 |
| 26 | Reinforcing fiber-1 | 25 | — | 0.1 | Adhesive compound-1 | 5 | 3,000 | Thermoplastic resin-1 | 100 | 30,000 | 0.8 | 160 |

A comparison between Examples 11 to 20 and Comparative Examples 20 to 23 and comparison between Example 21 and Comparative Example 24 show that in our fiber-reinforced composite material, the abundance ratio Rb' of the adhesive compound (B') is 1.2 or more, and in the fiber-reinforced composite material, the adhesive compound is localized on the circumference of reinforcing fibers so that interfacial bonding between the reinforcing fibers and the matrix resin is improved, and thus the resulting fiber-reinforced composite material is excellent in tensile strength.

A comparison among Examples 12, 13 and 15 shows that in our fiber-reinforced composite material, the abundance ratio Rb' of the adhesive compound (B') is 1.2 or more, and further, a compound having, in one molecule, two or more functional groups of at least one type selected from the group consisting of a carboxyl group, a hydroxyl group, an amino group and an epoxy group is deposited as the sizing agent (compound (E)) for the reinforcing fibers (C') so that interfacial bonding between the reinforcing fibers and the matrix resin can be further improved, and thus the resulting fiber-reinforced composite material is excellent in tensile strength. It is apparent that especially when E-1 is used as the compound (E), and the value obtained by dividing the mass average molecular weight of the compound (E) by the number of the above-described functional groups (the total number of carboxyl groups, hydroxyl groups, amino groups and epoxy groups) in one molecule is 40 to 150, the resulting fiber-reinforced composite material is excellent in tensile strength.

A comparison between Examples 13, 17 and 18 and Comparative Example 21 shows that in our fiber-reinforced composite material, the abundance ratio Rb' of the adhesive compound (B') is 1.2 or more, and further, an aliphatic polycarbodiimide is used as the adhesive compound (B') so that the resulting fiber-reinforced composite material is excellent in tensile strength.

A comparison among Examples 13, 14 and 21 shows that in our fiber-reinforced composite material, the abundance ratio Rb' of the adhesive compound (B') is 1.2 or more and, further, carbon fibers are used as the reinforcing fibers (C') so that the effect of improvement of interfacial bonding between the reinforcing fibers and the matrix resin is especially highly exhibited, and thus the resulting fiber-reinforced composite material is excellent in tensile strength.

A comparison between Examples 13 and 14 shows that in our fiber-reinforced composite material, the abundance ratio Rb' of the adhesive compound (B') is 1.2 or more and, further, carbon fibers are used as the reinforcing fibers (C') with the surface oxygen concentration ratio thereof set in the range of 0.10 to 0.30 so that the resulting fiber-reinforced composite material is excellent in tensile strength.

A comparison between Example 12 and Comparative Examples 25 and 26 shows that by selecting a method in which the thermoplastic resin (A') and the adhesive compound (B') are melted and kneaded, and then combined with the reinforcing fibers (C'), diffusion of the adhesive compound (B') into the thermoplastic resin (A') and aggregation of the adhesive compound (B') on the surfaces of the reinforcing fibers (C') are easily controlled, and therefore the abundance ratio Rb' is easily controlled to 1.2 or more so that a fiber-reinforced composite material excellent in tensile strength is obtained with high productivity.

INDUSTRIAL APPLICABILITY

In the fiber-reinforced resin composition, dynamic characteristics such as the tensile strength and elongation can be dramatically improved as compared to conventional products. Further, in the fiber-reinforced resin composition, dynamic characteristics are improved by using a low-molecular-weight PAS as a matrix resin so that a fiber-reinforced resin composition having dynamic characteristics as well as productivity and molding processability is obtained.

In the fiber-reinforced composite material, dynamic characteristics such as the tensile strength can be dramatically improved as compared to conventional products.

Accordingly, the fiber-reinforced resin composition and the fiber-reinforced composite material can be suitably used in electronic device housings, electric and electronic component applications, automobile components, vehicle related components, building materials, sporting goods and so on.

The invention claimed is:

1. A fiber-reinforced resin composition comprising a polyarylene sulfide (A), a carbodiimide compound (B) and carbon fibers (C) surface-treated with a sizing agent (D), wherein the carbodiimide compound (B) is an aliphatic carbodiimide compound, the sizing agent (D) is a compound having, in one molecule, three or more functional groups of at least one type selected from the group consisting of a carboxyl group and an amino group, the fiber-reinforced resin composition contains 0.1 to 10 parts by mass of the component (B) and 10 to 300 parts by mass of the component (C) based on 100 parts by mass of the component (A), and 0.01 to 5 parts by mass of the component (D) based on 100 parts by mass of the component (C), and the sulfur concentration ratio S/C measured by energy dispersive X-ray spectroscopy (EDX) satisfies formula (1):

$$10(\%) \leq \Delta S = (S2-S1)/S2 \times 100 \leq 70(\%) \quad (1)$$

wherein $\Delta S$ represents a gradient of the sulfur element concentration viewed at a cross section orthogonal to an axis center direction of the component (C), S1 represents a sulfur concentration ratio S/C in a region (T1) remaining after excluding the component (C) from inside of a circle drawn at a distance of 500 nm in a normal direction outward from the cross-sectional circle of the component (C), and S2 represents a sulfur concentration ratio S/C in a region (T2) remaining after excluding the component (C) and the region (T1) from the inside of the circle drawn at a distance of 500 nm in the normal direction outward from the region (T1).

2. The fiber-reinforced resin composition according to claim 1, wherein, in the compound constituting the sizing agent (D), the value obtained by dividing the mass average molecular weight of the compound by the number of the functional groups in one molecule is 40 to 150.

3. The fiber-reinforced resin composition according to claim 1, wherein the compound constituting the sizing agent (D) is an aliphatic compound.

4. The fiber-reinforced resin composition according to claim 1, wherein the carbon fibers (C) have a surface oxygen concentration ratio O/C of 0.05 to 0.50 as measured by X-ray photoelectron spectroscopy (XPS).

5. The fiber-reinforced resin composition according to claim 1, wherein the aliphatic carbodiimide compound has a mass average molecular weight of 500 to 10,000.

6. The fiber-reinforced resin composition according to claim 1, wherein the polyarylene sulfide (A) has a mass average molecular weight of 10,000 to 40,000.

7. The fiber-reinforced resin composition according to claim 1, wherein in the polyarylene sulfide (A), the amount of oligomers extracted with chloroform is 2% by mass or less.

8. The fiber-reinforced resin composition according to claim 1, wherein the sulfur concentration ratio S/C in the region (T2), which is measured by energy dispersive X-ray spectroscopy (EDX), is 0.1 to 0.2.

9. A fiber-reinforced composite material produced using the fiber-reinforced resin composition according to claim 1, wherein an abundance ratio Rb of the carbodiimide compound (B) is 1.2 or more, the abundance ratio Rb being given by formula (1):

$$Rb = R(\leq 500 \text{ nm})/R(>500 \text{ nm}) \quad (1)$$

R(623 500 nm): abundance of carbodiimide compound (B) within a distance of 500 nm from circumference of carbon fiber (C); and R(>500 nm): abundance of carbodiimide compound (B) outside a distance of 500 nm from circumference of carbon fiber (C).

10. A molded article formed by molding the fiber-reinforced resin composition according to claim 1.

* * * * *

UNITED STATES PATENT AND TRADEMARK OFFICE
CERTIFICATE OF CORRECTION

PATENT NO. : 10,308,775 B2
APPLICATION NO. : 15/032713
DATED : June 4, 2019
INVENTOR(S) : Imai et al.

Page 1 of 1

It is certified that error appears in the above-identified patent and that said Letters Patent is hereby corrected as shown below:

In the Claims

At Column 54, at Line 54, please change "R(623 500 nm):" to --R($\leq$ 500 nm):--.

Signed and Sealed this
Twenty-fourth Day of December, 2019

Andrei Iancu
*Director of the United States Patent and Trademark Office*